(12) United States Patent
Imai

(10) Patent No.: US 11,386,867 B2
(45) Date of Patent: Jul. 12, 2022

(54) IN-VEHICLE DISPLAY CONTROL DEVICE

(71) Applicant: MITSUBISHI ELECTRIC CORPORATION, Tokyo (JP)

(72) Inventor: Yoshie Imai, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/124,193

(22) Filed: Dec. 16, 2020

(65) Prior Publication Data

US 2021/0104207 A1    Apr. 8, 2021

Related U.S. Application Data

(63) Continuation of application No. PCT/JP2018/025964, filed on Jul. 10, 2018.

(51) Int. Cl.
*G09G 5/04*    (2006.01)
*G09G 5/10*    (2006.01)
(Continued)

(52) U.S. Cl.
CPC ............. *G09G 5/04* (2013.01); *B60K 35/00* (2013.01); *G02B 27/0101* (2013.01); *G06T 7/90* (2017.01); *G09G 5/10* (2013.01); *H04N 5/2253* (2013.01); *B60K 2370/152* (2019.05); *B60K 2370/21* (2019.05); *B60K 2370/349* (2019.05); *G02B 2027/0118* (2013.01); *G06T 2207/10024* (2013.01); *G06T 2207/30268* (2013.01); *G09G 2320/0626* (2013.01); *G09G 2354/00* (2013.01); *G09G 2360/144* (2013.01); *G09G 2380/10* (2013.01)

(58) Field of Classification Search
CPC combination set(s) only.
See application file for complete search history.

(56) References Cited

U.S. PATENT DOCUMENTS

| 5,214,413 A | 5/1993 | Okabayashi et al. |
| 10,319,312 B2* | 6/2019 | Lu ........................... G06F 3/013 |

(Continued)

FOREIGN PATENT DOCUMENTS

| JP | 64-1632 A | 1/1989 |
| JP | 2005-297716 A | 10/2005 |

(Continued)

OTHER PUBLICATIONS

"A colour appearance model for colour management systems: CIECAM02", Technical Report, CIE 159:2004, pp. 1-15, total of 11 pages.

(Continued)

*Primary Examiner* — Wesner Sajous
(74) *Attorney, Agent, or Firm* — Birch, Stewart, Kolasch & Birch, LLP

(57) ABSTRACT

An adaptation status judging unit (112) judges an adaptation status of a driver to a color. A goal color decision unit (113) decides a goal color of a display range based on the adaptation status of the driver. An applicable color decision unit (115) decides an applicable color of a display portion on a screen of a display based on the goal color, the display portion displaying information. A control unit (116) controls the display based on the applicable color of the display portion.

10 Claims, 19 Drawing Sheets

(51) Int. Cl.
  *G06T 7/90* (2017.01)
  *G02B 27/01* (2006.01)
  *B60K 35/00* (2006.01)
  *H04N 5/58* (2006.01)
  *H04N 5/225* (2006.01)

(56) References Cited

U.S. PATENT DOCUMENTS

| | | | |
|---|---|---|---|
| 2006/0158715 | A1 | 7/2006 | Furusawa et al. |
| 2014/0152711 | A1 | 6/2014 | Sekiya et al. |
| 2016/0109701 | A1* | 4/2016 | Goldman-Shenhar ............... G02B 27/01 345/8 |
| 2016/0288627 | A1 | 10/2016 | Trinh |
| 2017/0221425 | A1* | 8/2017 | Lu ........................... B60R 1/088 |

FOREIGN PATENT DOCUMENTS

| JP | 2006-199104 A | | 8/2006 | |
|---|---|---|---|---|
| JP | 2007-1417 A | | 1/2007 | |
| JP | 2008-1182 A | | 1/2008 | |
| JP | 2008-126804 A | | 6/2008 | |
| JP | 2008-1182 A | * | 10/2008 | ............... G09G 3/20 |
| JP | 2008-242134 A | | 10/2008 | |
| JP | 2009-83713 A | | 4/2009 | |
| JP | 2010-64567 A | | 3/2010 | |
| JP | 2010-184643 A | | 8/2010 | |
| JP | 2011-93413 A | | 5/2011 | |
| JP | 2013-15738 A | | 1/2013 | |
| JP | 5151207 B2 | | 2/2013 | |
| JP | 2013-250651 A | | 12/2013 | |
| JP | 2014-237338 A | | 12/2014 | |
| JP | 2017-506179 A | | 3/2017 | |

OTHER PUBLICATIONS

International Search Report for PCT/JP2018/025964 (PCT/ISA/210) dated Oct. 16, 2018.
ISO/CIE 11664-6, International Standard, First edition, Feb. 1, 2014, Colorimetry—Part 6: CIEDE2000 Colour-Difference Formula, pp. 1-9, total of 17 pages.
Kalloniatis et al., "Light and Dark Adaptation by Michael Kalioniatis and Charles Luu", Webvision, http://webvision.med.utah.edu/book/part-viii-gabac-receptors/light-and-dark-adaptation/, Dec. 26, 2017, total of 6 pages.
Saito et al. "A visibility prediction method between background and font colors using brightness difference and color difference", Academic Journal of Biomedical Fuzzy Systems Association, vol. 16, No. 1, pp. 91-96, (2014), total of 8 pages.

* cited by examiner

IN-VEHICLE DISPLAY CONTROL DEVICE

CROSS REFERENCE TO RELATED APPLICATION

This application is a Continuation of PCT International Application No. PCT/JP2018/025964, filed on Jul. 10, 2018, which is hereby expressly incorporated by reference into the present application.

TECHNICAL FIELD

The present invention relates to a technique of adjusting a luminance of in-vehicle display.

BACKGROUND ART

In nighttime driving, intense light is emitted from a headlight of an oncoming vehicle, an ambient street light, and so on.

Patent Literature 1 proposes a driving vision assistance device for preventing occurrence of unpleasant glare on a driver due to intense light, improving visual characteristics of the driver, and improving vision when driving in a dark place.

This device controls a pupil diameter of the driver's eye during driving in the dark place by radiating light to the driver's eye.

The following non-patent literatures describe information relating to human vision.

Non-Patent Literature 1 describes that perceived light intensity varies depending on the brightness and passage of time.

Non-Patent Literature 2 describes a color appearance model of a color space quantified in consideration of an adaptation status to a color.

Non-Patent Literature 3 describes how a color difference is found using CIEDE2000 standardized by the International Commission on Illumination (CIE) and the International Organization for Standardization (ISO).

Non-Patent Literature 4 describes a study of a prediction scheme using a color difference for a character or a symbol.

CITATION LIST

Patent Literature

Patent Literature 1: JP 2007-1417 A

Non-Patent Literature

Non-Patent Literature 1: Light and Dark Adaptation by Michael Kalloniatis and Charles Luu—Webvision
Non-Patent Literature 2: CIE 159 A colour appearance model for colour management systems: CIECAM02]
Non-Patent Literature 3: ISO 11664-6/CIE 014-6 Colorimetry—Part 6: CIEDE2000 Colour-Difference Formula
Non-Patent Literature 4: SAITO et al. "A visibility prediction method between background and font colors using brightness difference and color difference", Academic Journal of Biomedical Fuzzy Systems Association Vol. 16, No. 1, pp. 91-96 (2014)

SUMMARY OF INVENTION

Technical Problem

Drivers are not only watching outside a vehicle but also watching a display mounted in the vehicle. When a pupil diameter of the driver's eye changes, an amount of light coming incident on the eye also changes, and an adaptation status of the vision of the driver also changes. When ambient light around the display becomes bright, the display becomes difficult to see. In particular, in case of a head-up display, outside scenes and external light are superposed on a virtual image visually recognized by the driver, which makes the display more difficult to see.

An object of the present invention is to make it easy to see contents of a display mounted in a vehicle.

Solution to Problem

An in-vehicle display control device of the present invention includes:

an adaptation status judging unit to judge an adaptation status of a driver to a color, based on external-light color data expressing a time sequence of an external-light color of a vehicle in which a display is mounted;

a goal color decision unit to decide a goal color of a display range based on the adaptation status of the driver;

an applicable color decision unit to decide an applicable color of a display portion on a screen of the display based on the goal color, the display portion displaying information;

and a control unit to control the display based on the applicable color of the display portion.

Advantageous Effects of Invention

According to the present invention, contents of a display mounted in a vehicle can be made easy to see.

DESCRIPTION OF EMBODIMENTS

Figure 1:
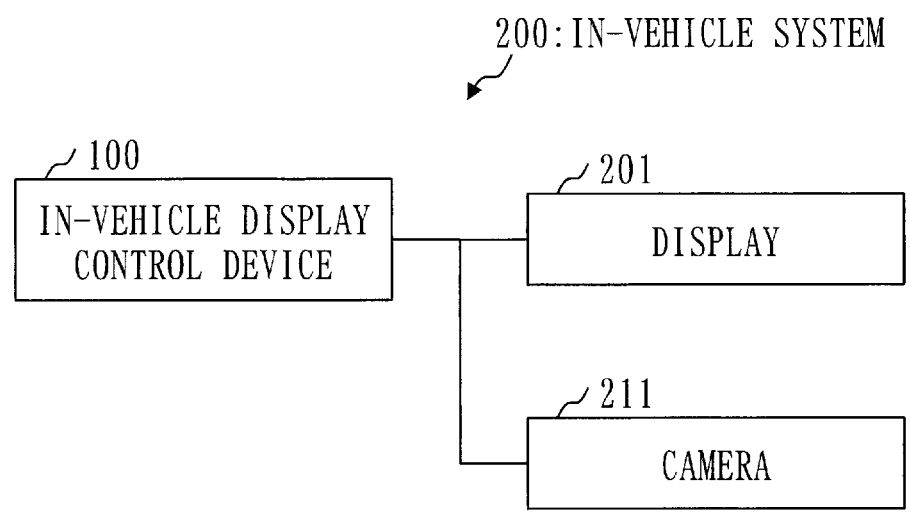
FIG. 1 is a configuration diagram of an in-vehicle system 200 in Embodiment 1.

In embodiments and drawings, the same element and the equivalent element are denoted by the same reference sign. Description of an element denoted by the same reference sign will be appropriately omitted or simplified. Arrows in the drawings mainly illustrate data flows or process flows.

Embodiment 1

A mode in which a luminance of in-vehicle display is controlled based on an intensity of external light will be described with referring to FIGS. 1 to 5.

Color is composed of three elements which are hue, lightness, and chroma. Embodiment 1 focuses on lightness among the three elements and, concerning external light, will employ intensity indicating a degree of lightness.

\*\*\*Description of Configurations\*\*\*

A configuration of an in-vehicle system 200 will be described with referring to FIG. 1.

The in-vehicle system 200 is a system that is to be mounted in a vehicle.

A specific vehicle is an automobile. Note that the in-vehicle system 200 may be mounted in a vehicle other than an automobile (such as a train).

The in-vehicle system 200 is provided with an in-vehicle display control device 100, a display 201, and a camera 211.

The display 201 is a device to display a virtual image. The display 201 is also called a display device. A specific display 201 is a head-up display. The camera 211 is also called an imaging device or an imaging sensor.

A configuration of the in-vehicle display control device 100 will be described with referring to FIG. 2.

The in-vehicle display control device 100 is a computer provided with hardware devices such as a processor 101, a memory 102, an auxiliary storage device 103, and an input/output interface 104. These hardware devices are connected to each other via signal lines.

The processor 101 is an Integrated Circuit (IC) that performs computation processing, and controls the other hardware devices. For example, the processor 101 is one or a combination of a Central Processing Unit (CPU) and a Graphics Processing Unit (GPU).

The memory 102 is a volatile storage device. The memory 102 is also called main storage device or a main memory. For example, the memory 102 is a Random Access Memory (RAM). Data stored in the memory 102 is saved in the auxiliary storage device 103 as necessary.

The auxiliary storage device 103 is a non-volatile storage device. For example, the auxiliary storage device 103 is a Read-Only Memory (ROM), a Hard Disk Drive (HDD), or a flash memory. Data stored in the auxiliary storage device 103 is loaded by the memory 102 as necessary.

The input/output interface 104 is a port to which an input device and an output device are connected. Specifically, the display 201, the camera 211, and so on are connected to the input/output interface 104.

The in-vehicle display control device 100 is provided with elements such as an external-light intensity estimation unit 111, an adaptation status judging unit 112, a goal color decision unit 113, an interim color decision unit 114, an applicable color decision unit 115, and a control unit 116. These elements are implemented by software. The external-light intensity estimation unit 111 is an example of an external-light color estimation unit.

In the auxiliary storage device 103, an in-vehicle display control program to cause the computer to function as the external-light intensity estimation unit 111, the adaptation status judging unit 112, the goal color decision unit 113, the interim color decision unit 114, the applicable color decision unit 115, and the control unit 116 is stored. The in-vehicle display control program is loaded by the memory 102 and executed by the processor 101.

Furthermore, an Operating System (OS) is stored in the auxiliary storage device 103. At least part of the OS is loaded by the memory 102 and executed by the processor 101.

In short, the processor 101 executes the in-vehicle display control program while executing the OS.

Data obtained by executing the in-vehicle display control program is stored in a storage device such as the memory 102, the auxiliary storage device 103, a register in the processor 101, and a cache memory in the processor 101.

The memory 102 functions as a storage unit 120 which stores data to be used by the in-vehicle display control device 100. Another storage device may function as the storage unit 120 in place of the memory 102 or along with the memory 102.

The in-vehicle display control device 100 may be provided with a plurality of processors that substitute for the processor 101. The plurality of processors share a role of the processor 101.

The in-vehicle display control program can be computer readably recorded (stored) in a non-volatile recording medium such as an optical disk and a flash memory.

\*\*\*Description of Operations\*\*\*

Operations of the in-vehicle display control device 100 correspond to an in-vehicle display control method. A procedure of the in-vehicle display control method corresponds to a procedure of the in-vehicle display control program.

The in-vehicle display control method will be described with referring to FIG. 3.

In the following description, a vehicle in which the in-vehicle system 200 is mounted will be simply referred to as a vehicle.

Step S110 to step S160 are executed repeatedly.

In step S110, the external-light intensity estimation unit 111 estimates an external-light intensity of the vehicle.

The external-light intensity of the vehicle refers to an intensity (such as luminance, illuminance, and lightness) of external light reaching into the vehicle.

A procedure of an external-light intensity estimation process (S110) will be described with referring to FIG. 4.

In step S111, the external-light intensity estimation unit 111 acquires a peripheral image.

A peripheral image is an image where a periphery of a vehicle is reflected.

Specifically, the camera 211 shoots a periphery of the vehicle. An image obtained by this shoot is the peripheral image. The external-light intensity estimation unit 111 acquires the peripheral image from the camera 211.

In step S112, the external-light intensity estimation unit 111 converts a value of each pixel of the peripheral image into a light intensity.

For example, the external-light intensity estimation unit 111 acquires, per pixel of the peripheral image, a light intensity that matches with a pixel value and a preset value of the camera 211, from an intensity conversion table.

The preset value of the camera 211 is obtained from the camera 211. For example, the preset value of the camera 211 is a shutter speed, an exposure time, or an aperture value.

The intensity conversion table is a table that relates a plurality of pixel values, a plurality of preset values, and a plurality of light intensities with each other, and is stored in the storage unit 120 in advance.

Step S112 will be supplemented.

The external-light intensity estimation unit 111 shoots a vehicle periphery using the camera 211 and detects external light from an obtained image.

In shooting with the camera 211, light reaching into a vehicle from an external light source such as the sun and a headlight is observed. Specifically, directly reaching light, light that reaches after having been transmitted through glass, light that reaches after having been reflected by an object, and so on are observed.

A density of observed light varies depending on the preset values of the camera 211 such as the shutter speed, the exposure time, and the aperture value. For example, light is weak in the nighttime. Therefore, in the nighttime, an exposure time longer than an exposure time in the daytime is set in the camera 211. If the exposure time is long, light is accumulated, so that a quite clear image can be obtained. As a result, an image almost similar to an image obtained by daytime shooting can be obtained by nighttime shooting. However, an intensity of actual light in the nighttime is small.

Hence, a relation among a pixel value, the preset value of the camera 211, and the light intensity is found in advance. Then, using this relation, the external-light intensity estimation unit 111 estimates an intensity of the actual light.

The description continues from step S113.

In step S113, the external-light intensity estimation unit 111 calculates an external-light intensity of the vehicle based on the light intensity of each pixel of the peripheral image.

The external-light intensity estimation unit 111 calculates the external-light intensity of the vehicle as follows.

First, the external-light intensity estimation unit 111 selects a particular area from the peripheral image.

Then, the external-light intensity estimation unit 111 calculates the external-light intensity of the vehicle, using the light intensity of each pixel of the particular area. For example, the external-light intensity estimation unit 111 calculates an average of light intensities of the particular area. The light intensity to be calculated is the external-light intensity of the vehicle.

Step S113 will be supplemented.

Regarding the detected external light, the external-light intensity estimation unit 111 estimates the intensity of the external light reaching into the vehicle. In brief, it can be assumed that light involved in the particular area of the peripheral image reaches into the vehicle. This is because the light from every area of the peripheral image does not reach into the vehicle.

Step S114 will be described.

In step S114, the external-light intensity estimation unit 111 registers the external-light intensity of the vehicle in external-light intensity data as being related to a time point. The external-light intensity data is an example of external-light color data.

The external-light intensity data is data expressing a time sequence of the external-light intensity. That is, the external-light intensity data expresses one external-light intensity or more in a time sequence. The external-light intensity data is stored in the storage unit 120.

Figure 3:
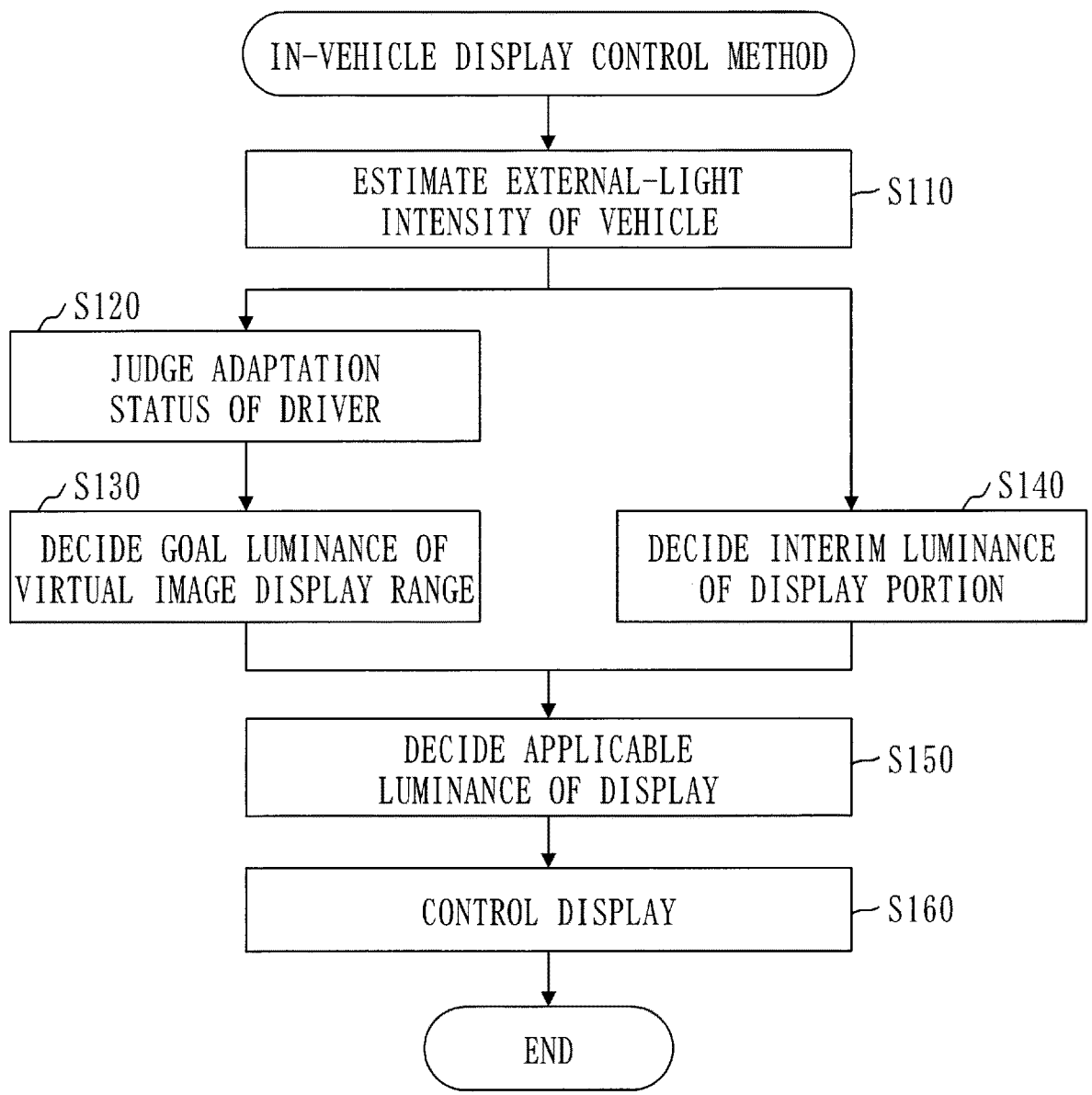
FIG. 3 is a flowchart of an in-vehicle display control method in Embodiment 1.

Getting back to FIG. 3, the description continues from step S120.

In step S120, the adaptation status judging unit 112 judges an adaptation status of a driver's vision, based on the external-light intensity data.

The adaptation status of the driver is expressed by bright-dark adaptation and an elapsed time.

Bright-dark adaptation is bright adaptation or dark adaptation.

Bright adaptation signifies adaptation to a change from a dark environment to a bright environment.

Dark adaptation signifies adaptation to a change from a bright environment to a dark environment.

An elapsed time of bright adaptation is a time that has elapsed after an in-vehicle environment has changed from a dark environment to a bright environment. An elapsed time of dark adaptation is a time that has elapsed after the in-vehicle environment has changed from a bright environment to a dark environment.

The adaptation status judging unit 112 judges bright-dark adaptation as follows.

The adaptation status judging unit 112 judges which one the present in-vehicle environment corresponds to between a bright environment and a dark environment, based on the present external-light intensity indicated by the external-light intensity data.

For example, the adaptation status judging unit 112 compares the present external-light intensity with an intensity threshold and judges the present in-vehicle environment based on a comparison result. If the present external-light intensity is equal to or higher than the intensity threshold, the present in-vehicle environment is a bright environment. If the present external-light intensity is less than the intensity threshold, the in-vehicle environment is a dark environment. The intensity threshold is determined in advance.

If the present in-vehicle environment is a bright environment, the adaptation status is bright adaptation.

If the present in-vehicle environment is a dark environment, the adaptation status is dark adaptation.

The adaptation status judging unit 112 judges the elapsed time of the adaptation status as follows.

The adaptation status judging unit 112 calculates an elapsed time of the adaptation status based on one external-light intensity or more indicated by the external-light intensity data.

For example, the adaptation status judging unit 112 acquires external-light intensity from the external-light intensity data in order from a new time point and judges bright-dark adaptation at a given time point based on the acquired external-light intensity. Then, the adaptation status judging unit 112 calculates an elapsed time of the present bright-dark adaptation based on the bright-dark adaptation at each time point.

In step S130, the goal color decision unit 113 decides a goal luminance of a virtual image display range based on the adaptation status of the driver.

The virtual image display range is an example of a display range of the display 201. Specifically, when the display 201 is a head-up display, the virtual image display range is a range where a virtual image is displayed by the display 201.

The goal luminance of the virtual image display range is a goal value of a luminance of the virtual image display range.

The goal color decision unit 113 decides the goal luminance as follows.

First, the goal color decision unit 113 acquires an adaptation luminance corresponding to the adaptation status of the driver from adaptation curve data. The adaptation curve data will be described later.

Then, the goal color decision unit 113 adds an offset luminance to the adaptation luminance. A luminance calculated by this is the goal luminance. The offset luminance is a luminance determined in advance.

The adaptation curve data will be described with referring to FIG. 5.

The adaptation curve data is data representing an adaptation curve.

The adaptation curve is a graph expressing an adaptation luminance, an elapsed time, and bright-dark adaptation as they are related to each other.

The adaptation luminance is an estimation value of the minimum luminance at which human photic sense is demonstrated.

Photic sense is sensation of light stimulation. In other words, photic sense means to receive brightness and darkness of light, a direction in which light comes, and so on.

A luminance can be converted into a luminous radiance. The luminance is expressed by a unit "$cd/m^2$". The luminous radiance is expressed by a unit "$lm/m^2$". Note that "cd" signifies candela, "lm" signifies lumen, and "$m^2$" signifies square meter.

Step S130 will be supplemented.

The goal color decision unit 113 estimates an adaptation status necessary for the driver, based on the intensity of light reaching into the vehicle.

A function of adaptation in a human visual system operates to enable correct recognition of an object even in an environment whose brightness varies. A human being adapts to the brightness of the environment not only by adjusting the pupil diameter but also by changing the sensitivity of retina cells.

To adapt to a change from a dark environment to a bright environment is called bright adaptation. To adapt to a change from a bright environment to a dark environment is called dark adaptation.

When an ambient atmosphere suddenly changes sharply, adaptation cannot catch up with it and the visual function temporarily degrades largely. Such a phenomenon occurs when, for example, the vehicle enters a tunnel, the vehicle comes out of a tunnel, and the vehicle is suddenly lit by light from a headlight of an oncoming vehicle.

After a while, however, the visual function adapts to the surrounding brightness, and the visual function is almost restored.

Figure 5:
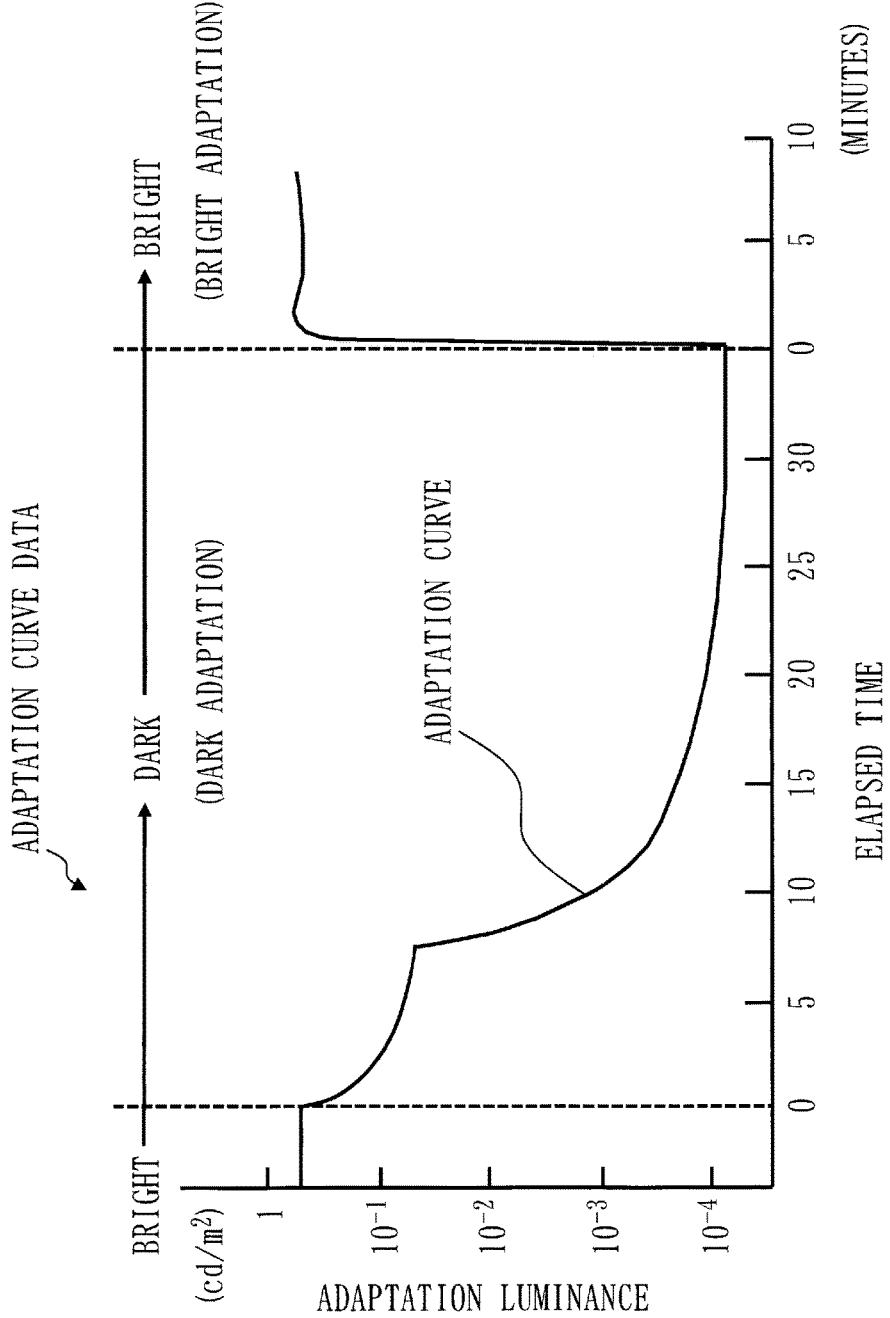
FIG. 5 is a diagram illustrating adaptation curve data in Embodiment 1.

Experiments have been done since quite a while on how a sensed light intensity differs depending on the brightness and the lapse of time, as in the adaptation curve of FIG. 5 (see Non-Patent Literature 1).

Namely, bright and dark ranges that can be discerned simultaneously are limited. Therefore, even the light having the same intensity can sometimes be discerned and sometimes cannot, depending on the adaptation status.

Likewise, even the light having the same intensity is sometimes felt glaring and sometimes not, depending on the adaptation status. Usually, a range that allows sensing an area of light that is 10 to the third power serves as a criterion for whether or not a person feels glaring.

Note that to be able to sense and to feel glaring are two different sensations. A range of feeling glaring can be found by experiments. To put it simply, it is possible to define, as a range of feeling glaring, a range from the minimum luminance (adaptation luminance) to a luminance that is 10 to the second power times as large as the minimum luminance. In this case, in step S130, 10 to the second power [$cd/m^2$] is used as the offset luminance.

Hence, the minimum luminance and the goal luminance can be estimated each as a luminance necessary for setting the driver in an adaptation status.

The description continues from step S140.

In step S140, the interim color decision unit 114 decides an interim luminance of a display portion based on the external-light intensity of the vehicle, the criterion luminance of the background portion, and the goal contrast ratio.

The criterion luminance is a criterion value of the luminance.

The goal contrast ratio is a goal value of a contrast ratio of the luminance of the display portion to the luminance of the background portion. The goal contrast ratio is determined in advance.

The display portion is a portion of the screen of the display 201 where information is to be displayed. The type of information is a character, a figure, or the like.

The background portion is a portion of the screen of the display 201 where information is not to be displayed.

The interim luminance is an interim value of the luminance of the display portion.

Specifically, the interim luminance is a luminance at which the contrast ratio to the criterion luminance becomes the goal contrast ratio when an external-light intensity is added.

For example, the interim color decision unit 114 calculates the interim luminance by executing the following expression.

$$(B+E):(X+E)=1:C$$

"X" is an interim luminance.
"E" is an external-light intensity.
"B" is a criterion luminance.
"1: C" is a goal contrast ratio.

Step S140 will be supplemented.

The interim color decision unit 114 predicts a luminance at which the visibility of the display 201 is maintained. When the display 201 is a head-up display, external light reaching into the vehicle is added as background light. That is, an offset is added to the background portion of the display 201. If the external light is intense, the visibility of the display 201 is degraded sharply. Therefore, it is necessary to maintain a visibility at which display is not interfered with even if an offset is added.

For example, assume that in a case where there is no external light, information is displayed with white light of 30 $cd/m^2$ on a background of 0.1 $cd/m^2$. In this case, the contrast ratio is 1:300. Subsequently, assume a case where there is external light. When the external light is of E $cd/m^2$, the contrast ratio is (E+0.1):(E+30). That is, the larger the external-light intensity E is, the less the visibility of display in white light. Therefore, it is required to intensify display in white light. Basically, the interim luminance should be set such that the goal contrast ratio is maintained. Note that for the display 201, there is an upper limit to the luminance. Hence, the interim luminance is equal to the maximum luminance of the display 201 or less.

In step S150, the applicable color decision unit 115 decides an applicable luminance of the display 201 based on the goal luminance of the display 201 and the interim luminance of the display portion.

Specifically, the applicable color decision unit 115 decides the applicable luminance of the display portion and the applicable luminance of the background portion.

The applicable luminance is a luminance to be applied to a given portion of the display 201.

The applicable color decision unit 115 decides the applicable luminance of the display 201 as follows.

First, the applicable color decision unit 115 calculates an estimated luminance of a virtual image display range of a case where the luminance of the display portion is adjusted to the interim luminance. For example, the applicable color decision unit 115 calculates an average of the external-light luminance, the interim luminance, and the criterion luminance. The luminance to be calculated is the estimated luminance of the virtual image display range.

Subsequently, the applicable color decision unit 115 compares the estimated luminance of the virtual image display range with the goal luminance.

Then, based on a comparison result, the applicable color decision unit 115 decides the applicable luminance of the display portion and the applicable luminance of the background portion.

For example, the applicable color decision unit 115 decides the applicable luminance of the display portion and the applicable luminance of the background portion as follows.

When the estimated luminance of the virtual image display range is equal to the goal luminance or more, the applicable color decision unit 115 decides the interim luminance to be the applicable luminance of the display portion, and decides the criterion luminance to be the applicable luminance of the background portion.

When the estimated luminance of the virtual image display range is less than the goal luminance, the applicable color decision unit 115 decides a luminance calculated by adding an offset value for the background portion to the criterion luminance, to be the applicable luminance of the background portion. Also, the applicable color decision unit 115 decides the interim luminance to be the applicable luminance of the display portion. Alternatively, the applicable color decision unit 115 may decide a luminance calculated by adding an offset value for the display portion to the interim luminance, to be the applicable luminance of the display portion.

Step S150 will be supplemented.

The applicable color decision unit 115 predicts an optimal luminance of the display 201 based on the goal luminance and the interim luminance.

The interim luminance merely increases the light intensity of the display portion. At this time, if the display portion is large, the luminance of the virtual image display range becomes high. If the display portion is small, the luminance of the virtual image display range does not become very high. In view of this, the applicable color decision unit 115 calculates to what value the estimated luminance of the virtual image display range will become. To put it simply, an average value of the luminance can be found as the estimated luminance. If the estimated luminance is higher than the goal luminance, the applicable color decision unit 115 decides the interim luminance to be the applicable luminance of the display portion. As a result, a luminance necessary for adaptation is ensured, and the visibility of the display 201 is maintained without making the driver feel glaring. If the estimated luminance is lower than the goal luminance, a luminance necessary for adaptation cannot be ensured unless some measures are taken. Therefore, the applicable color decision unit 115 adds an offset to the background portion so as to ensure the luminance necessary for adaptation. If offset is added excessively and the visibility decreases, the applicable color decision unit 115 increases the luminance of the display portion as well.

Step S160 will be described.

In step S160, the control unit 116 controls the display 201 based on the applicable luminance of the display portion and the applicable luminance of the background portion.

That is, the control unit 116 controls the display 201 such that the luminance of the display portion is adjusted to the applicable luminance of the display portion and that the luminance of the background portion is adjusted to the applicable luminance of the background portion.

For example, the control unit 116 inputs a signal that designates the applicable luminance of the display portion and the adaptable luminance of the background portion, to the display 201.

The display 201 adjusts the luminance of the display portion to the applicable luminance of the display portion and the luminance of the background portion to the applicable luminance of the background portion.

\*\*\*Effect of Embodiment 1\*\*\*

According to the present embodiment, it is possible to estimate the intensity of light reaching the vehicle while shooting the ambient optical environment, and to decide an optimum luminance on the display 201 taking both of adaptation and visibility into consideration. As a result, the visibility on the display 201 is maintained, and the adaptation status of the driver becomes close to bright adaptation. Then, it becomes possible to reduce glare on the driver and to ensure ease of viewing of the display 201.

\*\*\*Other Configurations\*\*\*

The display 201 may be a display device other than a head-up display. For example, the display 201 may be an instrument on an instrument panel, a screen of a vehicle navigation system, or a screen for an electronic mirror.

Embodiment 2

Embodiment 1 describes a case where, taking lightness being one of elements constituting a color, as an example and defining a degree of lightness of external light as an external-light intensity, display luminance on a display is controlled based on the external-light intensity. However, the element which the control is based on is not limited to lightness. Displaying to a display may be controlled using hue or chroma each being another element constituting a color, or using any combination of hue, lightness, and chroma.

Figure 6:
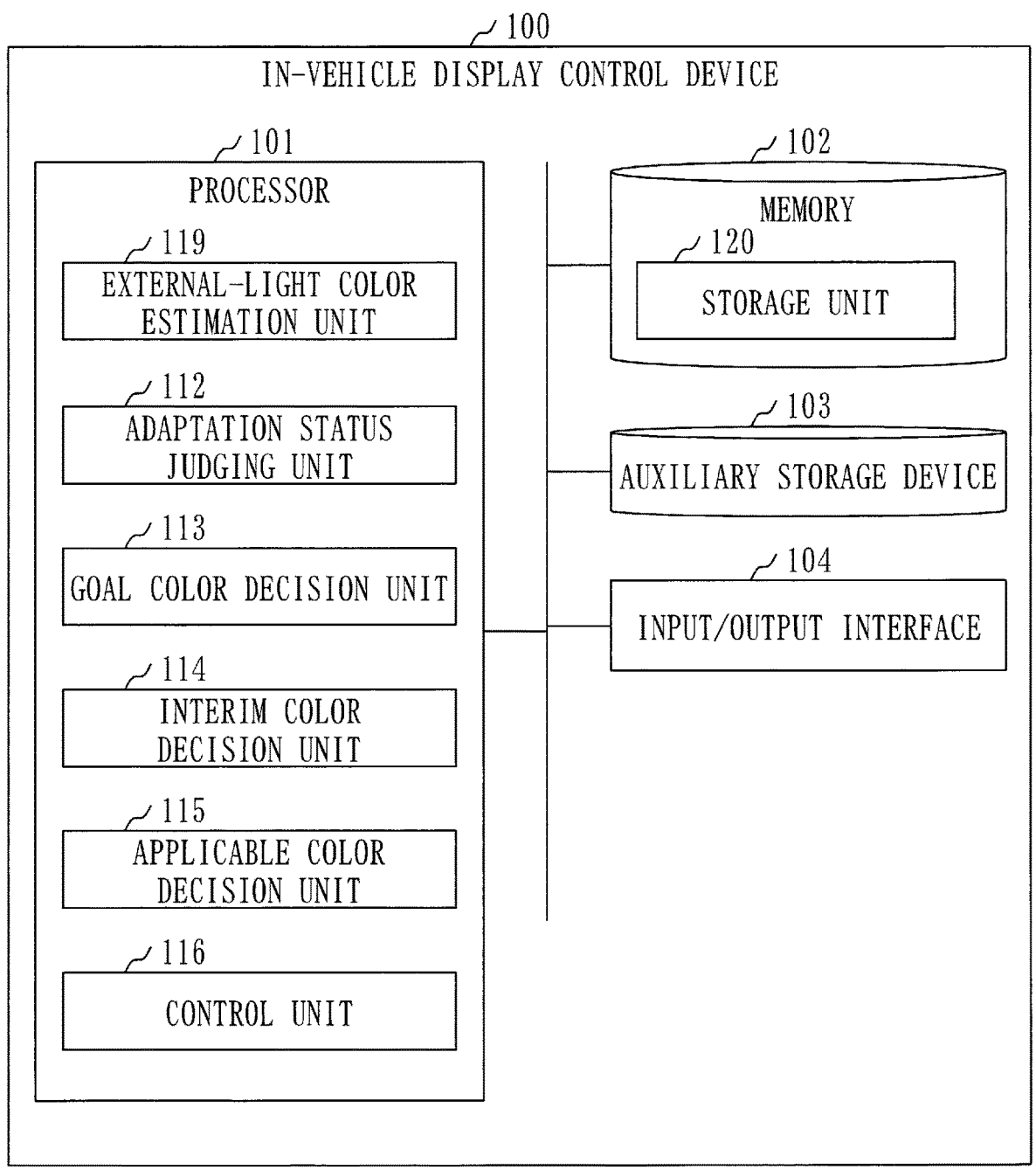
FIG. 6 is a configuration diagram of an in-vehicle display control device 100 in Embodiment 2.
Figure 7:
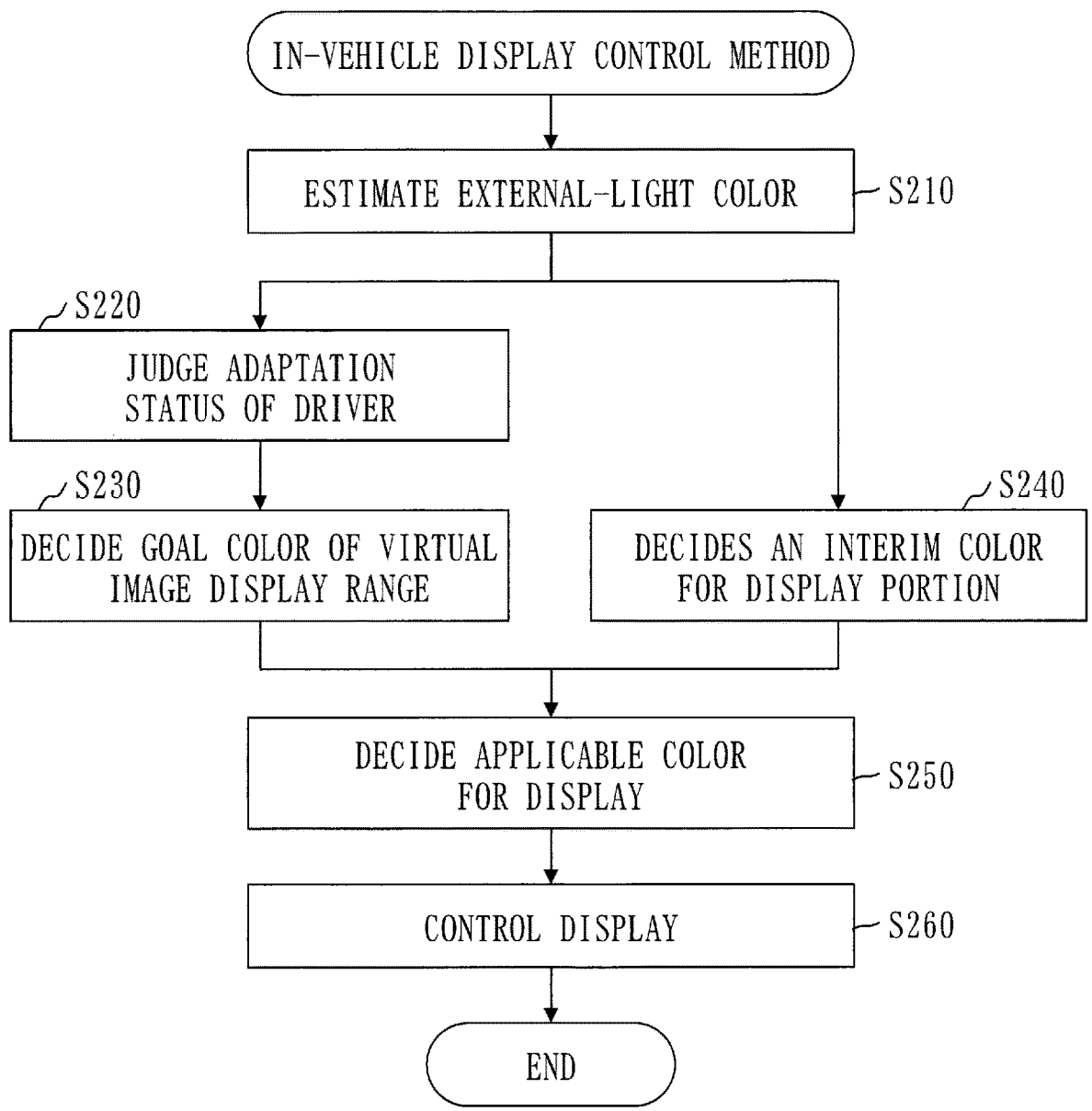
FIG. 7 is a flowchart of an in-vehicle display control method in Embodiment 2.
Figure 8:
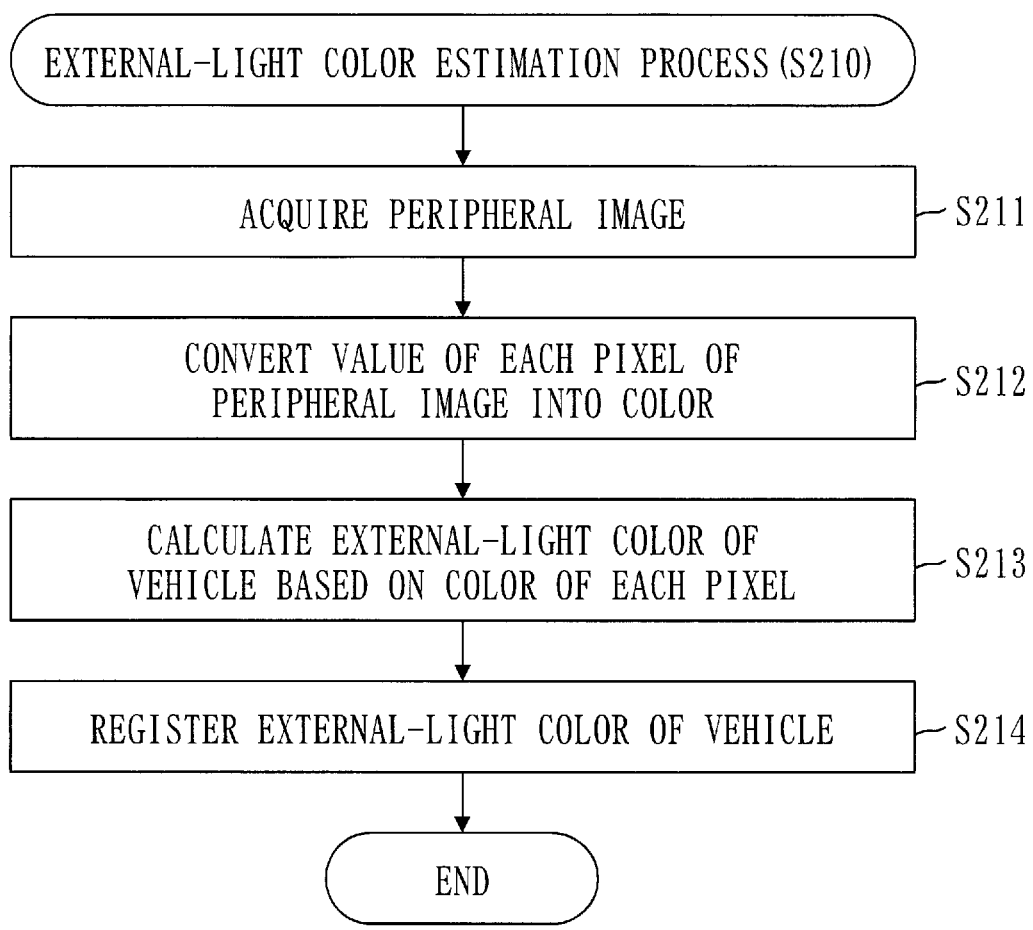
FIG. 8 is a flowchart of an external-light color estimation process (S210) in Embodiment 2.

Embodiment 2 describes a mode in which one or a combination of hue, lightness, and chroma is treated as a "color" and a color of external light is taken into consideration, with referring to FIGS. 6 to 8 mainly regarding a difference from Embodiment 1.

\*\*\*Description of Configurations\*\*\*

A configuration of an in-vehicle system 200 is the same as the corresponding configuration in Embodiment 1 (see FIG. 1).

A configuration of an in-vehicle display control device 100 will be described with referring to FIG. 6.

The in-vehicle display control device 100 is provided with an element which is an external-light color estimation unit 119, in place of the external-light intensity estimation unit 111 of Embodiment 1. The external-light color estimation unit 119 is implemented by software.

An in-vehicle display control program causes a computer to function as the external-light color estimation unit 119, not as the external-light intensity estimation unit 111.

*Description of Operations*

An in-vehicle display control method will be described with referring to FIG. 7. Step S210 to step S260 are executed repeatedly.

In step S210, the external-light color estimation unit 119 estimates an external-light color of a vehicle.

The external-light color of the vehicle means a color of external light reaching into the vehicle.

The color is expressed by brightness (luminance), tinge (hue), and glow (chroma). A pair of tinge and glow is called chromaticity.

A procedure of an external-light color estimation process (S210) will be described with referring to FIG. 8.

In step S211, the external-light color estimation unit 119 acquires a peripheral image.

Figure 4:
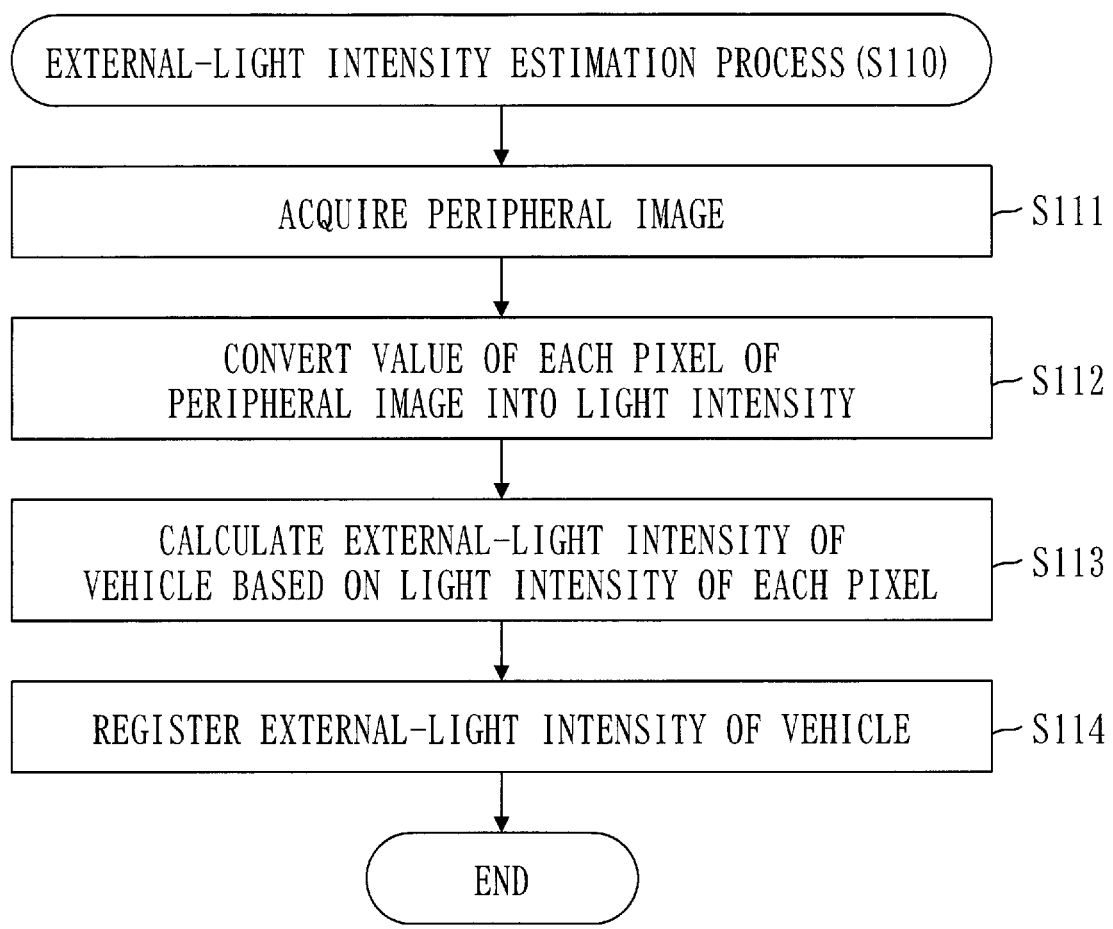
FIG. 4 is a flowchart of an external-light intensity estimation process (S110) in Embodiment 1.

Step S211 is the same as step S111 in Embodiment 1 (see FIG. 4).

In step S212, the external-light color estimation unit 119 converts a value of each pixel of the peripheral image into a color.

For example, the external-light color estimation unit 119 acquires, per pixel of the peripheral image, a color that matches with a pixel value and a preset value of a camera 211, from a color conversion table.

The color conversion table is a table that relates a plurality of pixel values, a plurality of preset values, and a plurality of colors with each other, and is stored in a storage unit 120 in advance.

Step S212 will be supplemented.

The external-light color estimation unit 119 estimates a color of actual light, taking into consideration that an observed density of color differs depending on the preset value of the camera 211.

The description continues from step S213.

In step S213, the external-light color estimation unit 119 calculates an external-light color of the vehicle based on the color of each pixel of a peripheral image.

The external-light color estimation unit 119 calculates the external-light color of the vehicle as follows.

First, external-light color estimation unit 119 selects a particular area from the peripheral image.

Then, the external-light color estimation unit 119 calculates the external-light color of the vehicle, using the color of each pixel of the particular area. For example, the external-light color estimation unit 119 calculates an average of colors of the particular area. The color to be calculated is the external-light color of the vehicle.

Step S213 will be supplemented.

There is a case where an adaptation status and a visibility cannot be estimated appropriately if only the intensity of external light is taken into consideration. For example, when the external light is light in a tunnel or light of sunset, orange-color intense light is observed as the external light. In this case, if focusing only on the intensity of the external light, a visibility of an orange-color character or a near-orange red-color character decreases largely. For this reason, it is desirable to also take the color of the external light into consideration.

Step S214 will be described.

In step S214, the external-light color estimation unit 119 registers the external-light color of the vehicle in external-light color data as being related to a time point.

The external-light color data expresses a time sequence of the external-light color. That is, the external-light color data expresses one external-light color or more in a time sequence. The external-color data is stored in the storage unit 120.

Getting back to FIG. 7, the description continues from step S220.

In step S220, an adaptation status judging unit 112 judges an adaptation status of the driver to a color, based on the time sequence of the external-light color indicated by the external-light color data.

The adaptation status judging unit 112 judges the adaptation status of the driver to the color as follows.

First, the adaptation status judging unit 112 judges a present interior color of the vehicle based on the present external-light color indicated by the external-light color data. For example, interior color data is stored in the storage unit 120 in advance. The interior color data relates a plurality of color ranges and a plurality of interior colors with each other. Then, the adaptation status judging unit 112 acquires an interior color that matches with a color range which the present external-light color belongs to, from the interior color data.

Then, the adaptation status judging unit 112 calculates an elapsed time of the adaptation status based on one external-light color or more indicated by the external-light color data. For example, the adaptation status judging unit 112 acquires external-light color from the external-light color data in order from a new time point, and judges an interior color at a given time point based on the acquired external-light color. Then, the adaptation status judging unit 112 calculates an elapsed time of the present interior color based on an interior color at each time point.

Furthermore, the adaptation status judging unit 112 decides an adaptation status to a color based on an interior color preceding the present interior color and based on the present interior color. An adaptation status to a color includes information such as a bright-dark adaptation, a color adaptation, and an elapsed time.

Step S220 will be implemented.

For example, when entering an indoor space lit by an incandescent lamp from outdoor of fine weather, a space in a room is at first sensed to be of orange color, but gradually the orange color becomes non-sensible.

This phenomenon is supposed to be caused by adjustment of sensitivity in three types of cones existing in human retina. The three types of cones are an L cone, an M cone, and an S cone. Each cone is a cell that senses a color.

When in outdoor, the sensitivities of the cones are almost the same. Entering indoor, a response output of the L cone becomes high as a reaction to long-wavelength, high-intensity orange-color light, so that the entire space is sensed to be of the orange color. However, as the time passes, the sensitivity of each cone is adjusted, and the entire space is sensed to be of white color.

The International Commission in Illumination (CIE) standardizes a color appearance model (CAM) for a color space quantified with an adaptation status to a color being taken into consideration. The CIE published a technical document (Non-Patent Literature 2) of CIECAM02.

According to CIECAM02, an observation condition is set in the form of an observation parameter. By matching the observation parameter to a surrounding circumstance, a color that is sensed when complete adaptation is achieved, and an adaptation luminance can be found.

Step S230 will be described.

In step S230, a goal color decision unit 113 decides a goal color of the virtual image display range based on the adaptation status of the driver to the color.

For example, a color model is stored in the storage unit 120 in advance. The color model is data corresponding to the color appearance model (to be described later), and relates a plurality of adaptation statuses and a plurality of adaptable colors with each other. Then, the goal color decision unit 113 selects an adaptable color that matches with the adaptation status of the driver to the color, from the color model. The adaptable color to be selected is the goal color of the virtual image display range.

Step S230 will be supplemented.

In the CIECAM02, observation parameters such as "average", "dim", and "dark" are defined as surrounding circumstances. A value between such observation parameters can also be utilized as an observation parameter for a surrounding circumstance. To achieve a found adaptation luminance and a found color are the goal.

In the present embodiment, bright-dark adaptation and color adaptation are found separately. If it is possible to find both of bright-dark adaptation and color adaptation at once, the both may be found at once. For example, a model for finding the both at once may be prepared, and the both may be found at once by using the model.

Step S240 will be described.

In step S240, an interim color decision unit 114 decides an interim color of a display portion based on an external-light color of the vehicle.

For example, the interim color decision unit 114 decides an interim color of the display portion by one of the following methods.

The interim color decision unit 114 decides a complementary color to an external-light color of the vehicle, to be the interim color of the display portion. That is, when the external-light color of the vehicle is orange color, the interim color decision unit 114 decides blue-green to be the interim color of the display portion. Blue-green color is a complementary color to orange color.

The interim color decision unit 114 decides a color having a specified color difference with respect to an external-light color, to be an interim color of the display portion. The specified color difference is a predetermined color difference.

Step S240 will be supplemented.

The interim color decision unit 114 predicts a luminance and a color in order to maintain the visibility of a display 201. Estimation of visibility improves by taking an external-light color into consideration.

For example, when the external-light color is orange color, there is a possibility that display in red color becomes difficult to recognize even if the luminosity is high. In this case, information may be displayed in another color so that the visibility is maintained. Another color may be blue-green color being a complementary color to orange color. In a color space such as CIECAM, RGB, and CIELAB, visibility is maintained if the color difference is held at a predetermined level or more. Simply speaking, the color difference is expressed by a Euclidian distance in the color space. The color difference can also be found with using CIEDE2000 standardized by CIE and ISO (see Non-Patent Literature 3).

Usually, in a state where different colors are in contact with each other, a human being can distinguish colors easily when the color difference specified by CIELAB exceeds 10. A prediction scheme using a color difference has been studied for characters or symbols (see Non-Patent Literature 4). This scheme may also be employed.

Step S250 will be described.

In step S250, an applicable color decision unit 115 decides an applicable color of the display 201 based on the goal color of the virtual image display range and the interim color of the display portion.

Specifically, the applicable color decision unit 115 decides the applicable color of the display portion and the applicable color of the background portion.

The applicable color is a color to be applied to a given portion of the display 201.

The applicable color decision unit 115 decides the applicable color of the display 201 as follows.

First, the applicable color decision unit 115 calculates an estimated color of the virtual image display range of a case where the color of the display portion is adjusted to the interim color. For example, the applicable color decision unit 115 calculates a color that is obtained by superposing an external-light color, an interim color, and a reference color. The color to be calculated is the estimated color of the virtual image display range.

If the estimated color of the virtual image display range is not an achromatic color, the applicable color decision unit 115 compares the estimated color of the virtual image display range with the goal color.

Then, based on a comparison result, the applicable color decision unit 115 decides the applicable color of the display portion and the applicable color of the background portion.

If the color difference between the estimated color and the goal color is equal to a color difference threshold or less, the applicable color decision unit 115 decides the interim color to be the applicable color of the display portion, and decides the reference color to be the applicable color of the background portion.

If the color difference between the estimated color and the goal color is larger than the color difference threshold, the applicable color decision unit 115 decreases the color difference between the interim color and the reference color by changing at least either the interim color or the reference color.

If the estimated color of the virtual image display range is an achromatic color, the applicable color decision unit 115 decreases the color difference between the interim color and the reference color by changing at least either the interim color or the reference color.

If the interim color is not to be changed, the applicable color decision unit 115 decides the interim color to be the applicable color of the display portion.

If the interim color is changed, the applicable color decision unit 115 decides the post-change interim color to be the applicable color of the display portion.

If the reference color is not to be changed, the applicable color decision unit 115 decides the reference color to be the applicable color of the background portion.

If the reference color is changed, the applicable color decision unit 115 decides the post-change reference color to be the applicable color of the background portion.

Step S250 will be supplemented.

The applicable color decision unit 115 decides a control content of the display 201, taking into consideration not only the luminance but also the color. Basically, the applicable color of the display 201 is decided based on the average of colors on the display 201. When, however, the color of the display portion and the color of the background portion are largely different, there is a possibility that the average of colors on the display 201 becomes an achromatic color. In this case, the applicable color decision unit 115 adjusts the applicable color so that the visibility can be maintained while giving priority to the applicable luminance that achieves the goal luminance.

If the brightness of the goal color is different from the goal luminance and the brightness of the interim color is different from the interim luminance, priority may be given to the luminance, and the goal color and the interim color may be changed in accordance with the luminance.

Step S260 will be described.

In step S260, a control unit 116 controls the display 201 based on the applicable color of the display portion and based on the applicable color of the background portion.

That is, the control unit 116 controls the display 201 such that the color of the display portion is adjusted to the applicable color of the display portion and that the color of the background portion is adjusted to the applicable color of the background portion.

For example, the control unit 116 inputs a signal that designates the applicable color of the display portion and the applicable color of the background portion, to the display 201.

The display 201 adjusts the color of the display portion to the applicable color of the display portion and the color of the background portion to the applicable color of the background portion.

*Effect of Embodiment 2*

According to the present embodiment, it is possible to estimate the intensity of light reaching the vehicle and the color of light reaching the vehicle while shooting the ambient optical environment, and to decide an optimum luminance on the display 201 and an optimum color on the display 201 taking both of adaptation and visibility into consideration. As a result, even when the external-light color is not white, the visibility on the display 201 is maintained, and the adaptation status of the driver becomes close to bright adaptation. Then, it becomes possible to reduce glare on the driver.

Embodiment 3

Figure 9:
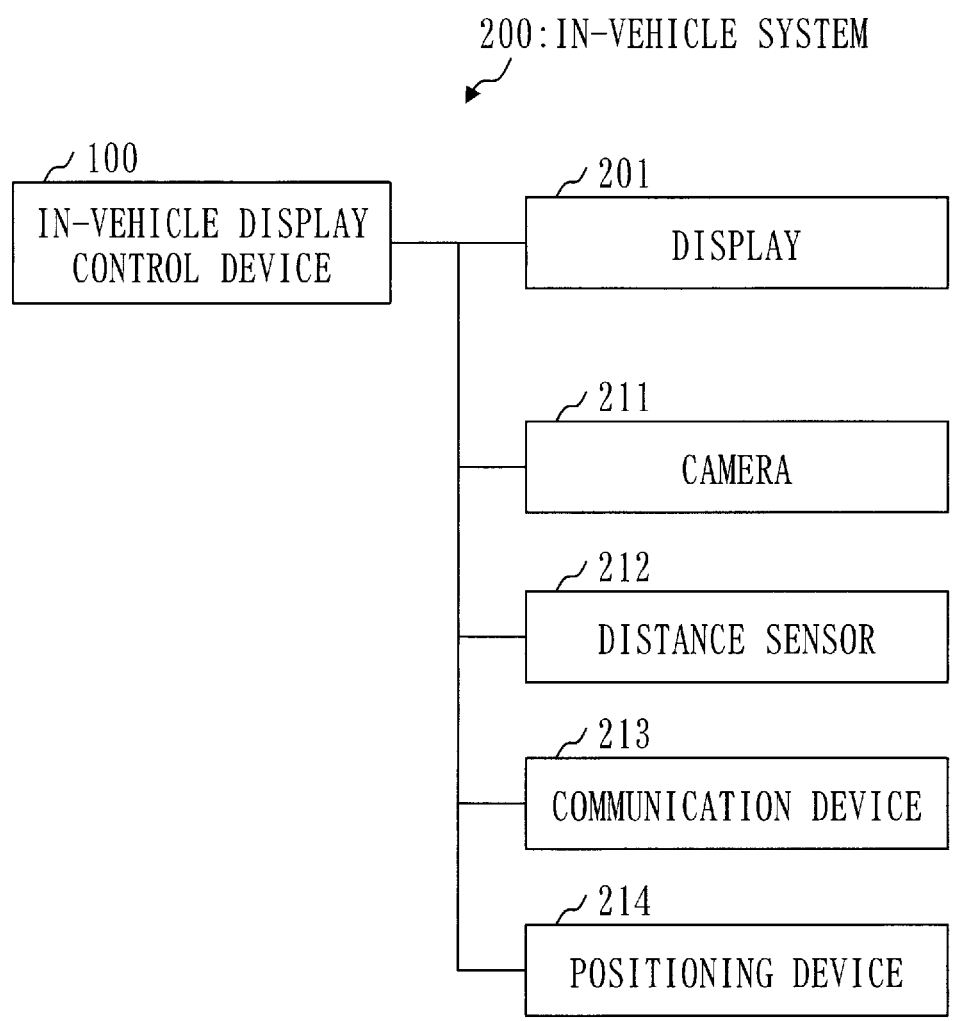
FIG. 9 is a configuration diagram of an in-vehicle system 200 in Embodiment 3.
Figure 10:
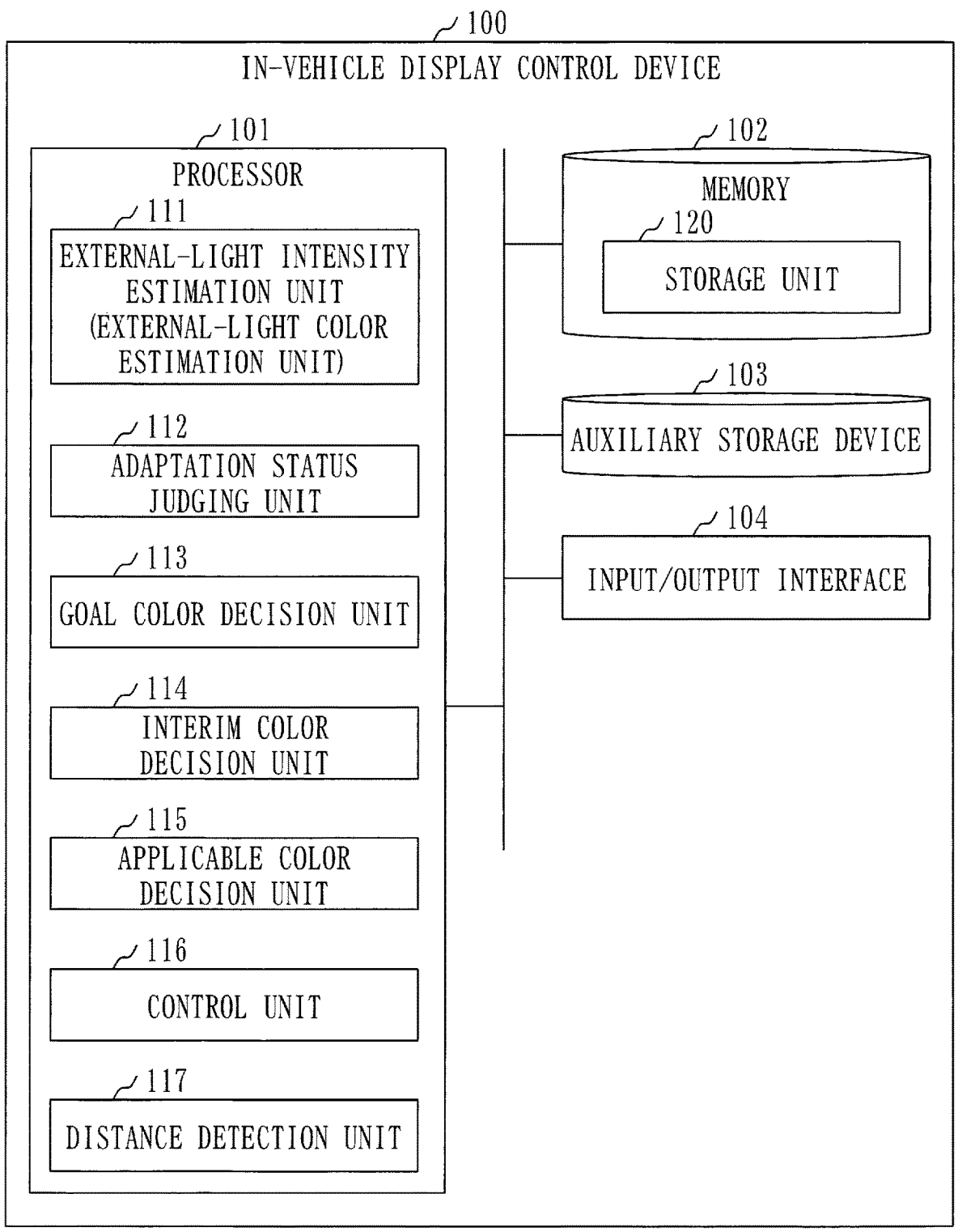
FIG. 10 is a configuration diagram of an in-vehicle display control device 100 in Embodiment 3.
Figure 11:
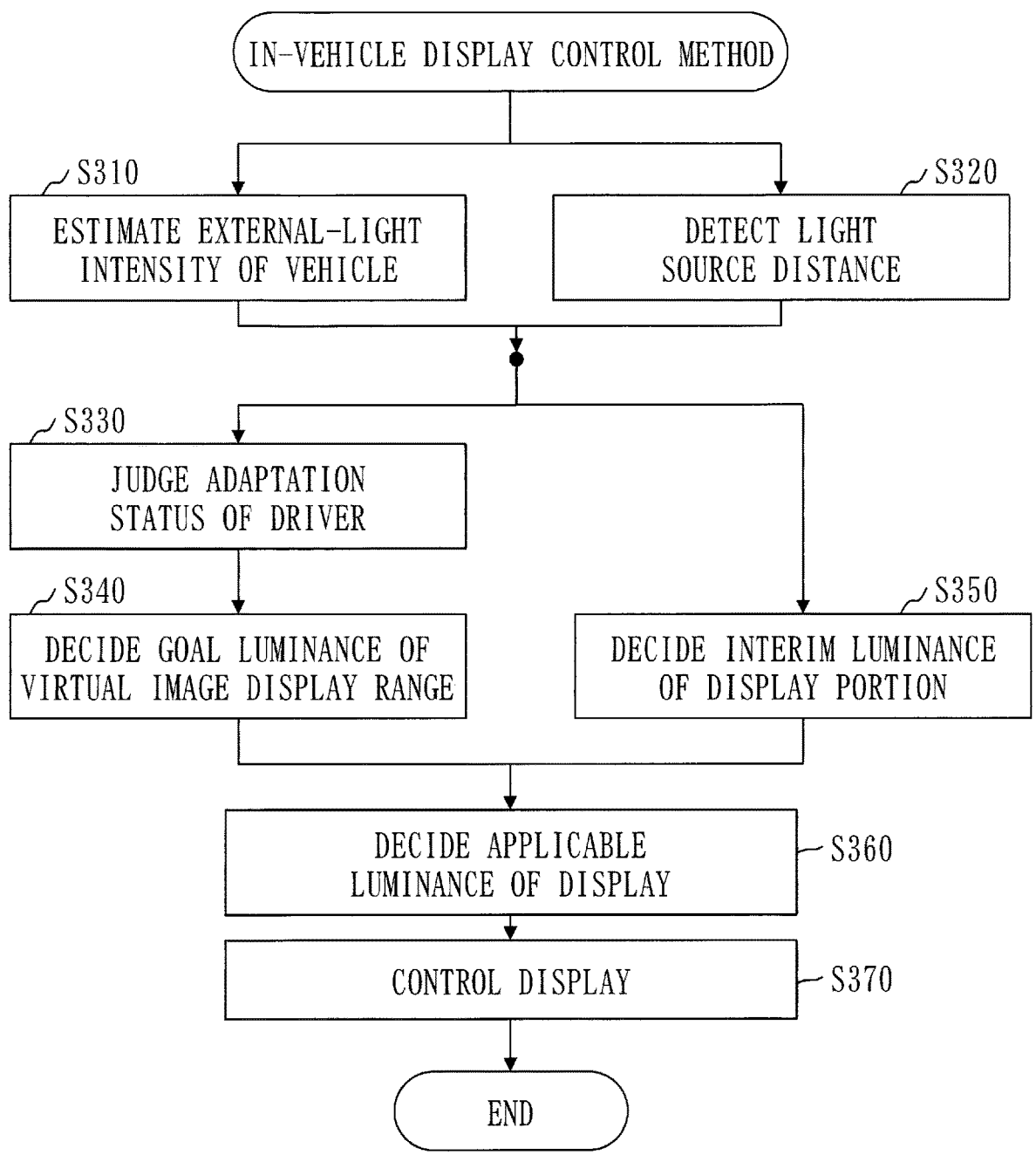
FIG. 11 is a flowchart of an in-vehicle display control method in Embodiment 3.

A mode in which a distance to a light source of external light is taken into consideration will be described with referring to FIGS. 9 to 11 mainly regarding a difference from Embodiment 1.

*Description of Configurations*

A configuration of an in-vehicle system 200 will be described with referring to FIG. 9.

The in-vehicle system 200 is further provided with a distance sensor 212, a communication device 213, and a positioning device 214.

The distance sensor 212 is a sensor to measure a distance to a light source. For example, the distance sensor 212 is a milliwave radar, a Light Detection and Ranging (LiDAR), or a sonar.

The communication device 213 is a communication device for vehicle-to-vehicle communication. Specifically, the communication device 213 is a receiver/transmitter.

The positioning device 214 is a device to position a vehicle. For example, the positioning device 214 performs positioning utilizing the Global Positioning System (GPS).

A configuration of an in-vehicle display control device 100 will be described with referring to FIG. 10.

The in-vehicle display control device 100 is provided with an element which is a distance detection unit 117, in addition to the elements in Embodiment 1. The distance detection unit 117 is implemented by software.

An in-vehicle display control program causes a computer to further function as the distance detection unit 117.

*Description of Operations*

An in-vehicle display control method will be described with referring to FIG. 11.

Step S310 to step S370 are executed repeatedly.

In step S310, an external-light intensity estimation unit 111 estimates an external-light intensity of the vehicle.

A method for estimation is the same as the method of step S110 in Embodiment 1 (see FIG. 4).

In step S320, the distance detection unit 117 detects a light source distance. The light source distance is a distance to a light source that emits external light.

Then, the distance detection unit 117 registers the light source distance in the light source distance data as being related to a time point.

The light source distance data is data expressing a time sequence of the light source distance. That is, the light source distance data expresses one light source distance or more in a time sequence. The light source distance data is stored in a storage unit 120.

For example, the distance detection unit 117 detects the light source distance as follows.

First, the distance detection unit 117 judges a light source direction based on a peripheral image. The light source direction is a direction in which a light source reflected in the peripheral image is located with respect to the vehicle. Specifically, the distance detection unit 117 detects a position of the light source on the peripheral image based on a value of each pixel of the peripheral image. Then, the distance detection unit 117 calculates the light source direction based on shooting parameters (a shooting direction, a shooting range, and so on) of a camera 211 and based on the position of the light source on the peripheral image.

Then, the distance detection unit 117 measures the distance to the light source located in the light source direction, using the distance sensor 212.

For example, the distance detection unit 117 detects the light source distance as follows. Note that the light source of the external light is a headlight of an oncoming vehicle.

First, the distance detection unit 117 communicates with the oncoming vehicle, using the communication device 213. This allows the distance detection unit 117 to obtain information of the oncoming vehicle. For example, position information, speed information, and headlight information can be obtained.

Also, the distance detection unit 117 obtains position information of the vehicle from the positioning device 214. A specific example of the positioning device is a Global Positioning System (GPS).

Then, the distance detection unit 117 calculates a distance to the oncoming vehicle based on the position information of the vehicle and the position information of the oncoming vehicle.

For example, the distance detection unit 117 detects the light source distance as follows. Note that the camera 211 is a stereo camera.

The distance detection unit 117 performs image processing of a plurality of peripheral images obtained by the stereo camera, so as to calculate the light source distance to a light source reflected in the plurality of peripheral images.

In step S330, an adaptation status judging unit 112 judges an adaptation status of the driver based on external-light intensity data.

A method for judgment is the same as the method of step S120 in Embodiment 1 (see FIG. 3).

In step S340, a goal color decision unit 113 decides a goal luminance of a virtual image display range, based on the adaptation status of the driver.

A method for decision is the same as the method of step S130 in Embodiment 1.

Also, the goal color decision unit 113 judges a change tendency of the light source distance based on the light source distance data. That is, the goal color decision unit 113 judges whether the light source is approaching or is going away.

Then, the goal color decision unit 113 adjusts a goal luminance of a display 201 based on the change tendency of the light source distance.

If the light source distance is becoming short, that is, if the light source is approaching, the goal color decision unit 113 decreases the goal luminance of the display 201 by a luminance adjustment amount.

If the light source distance is becoming long, that is, if the light source is going away, the goal color decision unit 113 increases the goal luminance of the display 201 by the luminance adjustment amount.

The luminance adjustment amount is a predetermined value. Alternatively, the luminance adjustment amount may be calculated based on the speed of change of the light source distance.

In step S350, an interim color decision unit 114 decides an interim luminance of a display portion based on the external-light intensity of the vehicle, the reference luminance of a background portion, and a goal contrast ratio.

A method for decision is the same as the method of step S140 in Embodiment 1.

In step S360, an applicable color decision unit 115 decides an applicable luminance of the display 201 based on the goal luminance of the display 201 and the interim luminance of the display portion.

A method for decision is the same as the method of step S150 in Embodiment 1.

In step S370, the control unit 116 controls the display 201 based on the applicable luminance of the display portion and the applicable luminance of the background portion.

A method for control is the same as the method of step S160 in Embodiment 1.

*Effect of Embodiment 3*

According to the present embodiment, shift of the adaptation status can be made continuously with taking the distance to the light source into consideration. As a result, the visibility can be maintained and glare can be decreased without imposing a burden on the driver.

*Other Configurations*

Embodiment 2 may be applied to the present embodiment. That is, the applicable color of the display 201 may be decided with taking the external-light color (including the external-light intensity) into consideration.

The light source distance may be utilized to improve an estimation accuracy of the external-light intensity.

A relative speed of the oncoming vehicle to the vehicle may be calculated based on the time sequence of the light source distance. A time that passes until a change to another adaptation status may be estimated based on the relative speed. The estimated time may be utilized for deciding the goal luminance.

Embodiment 4

A mode in which a type of a headlight that emits external light is taken into consideration will be described with referring to FIGS. 12 to 15 mainly regarding a difference from Embodiment 1.

*Description of Configurations*

Figure 12:
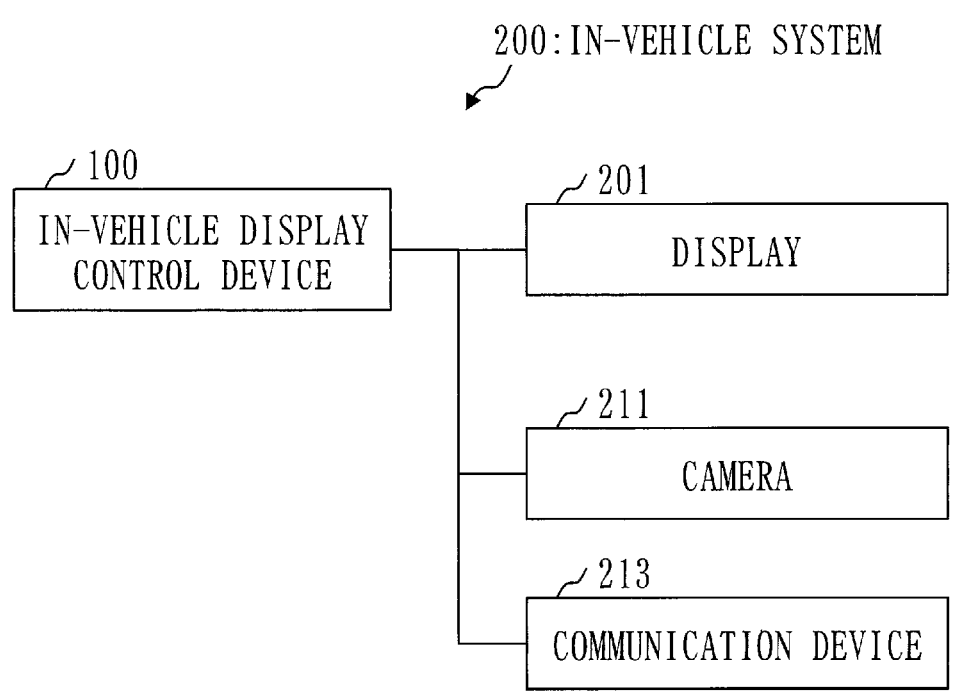
FIG. 12 is a configuration diagram of an in-vehicle system 200 in Embodiment 4.

A configuration of an in-vehicle system 200 will be described with referring to FIG. 12.

The in-vehicle system 200 is further provided with a communication device 213.

The communication device 213 is a communication device for vehicle-to-vehicle communication. Specifically, the communication device 213 is a receiver/transmitter.

Figure 13:
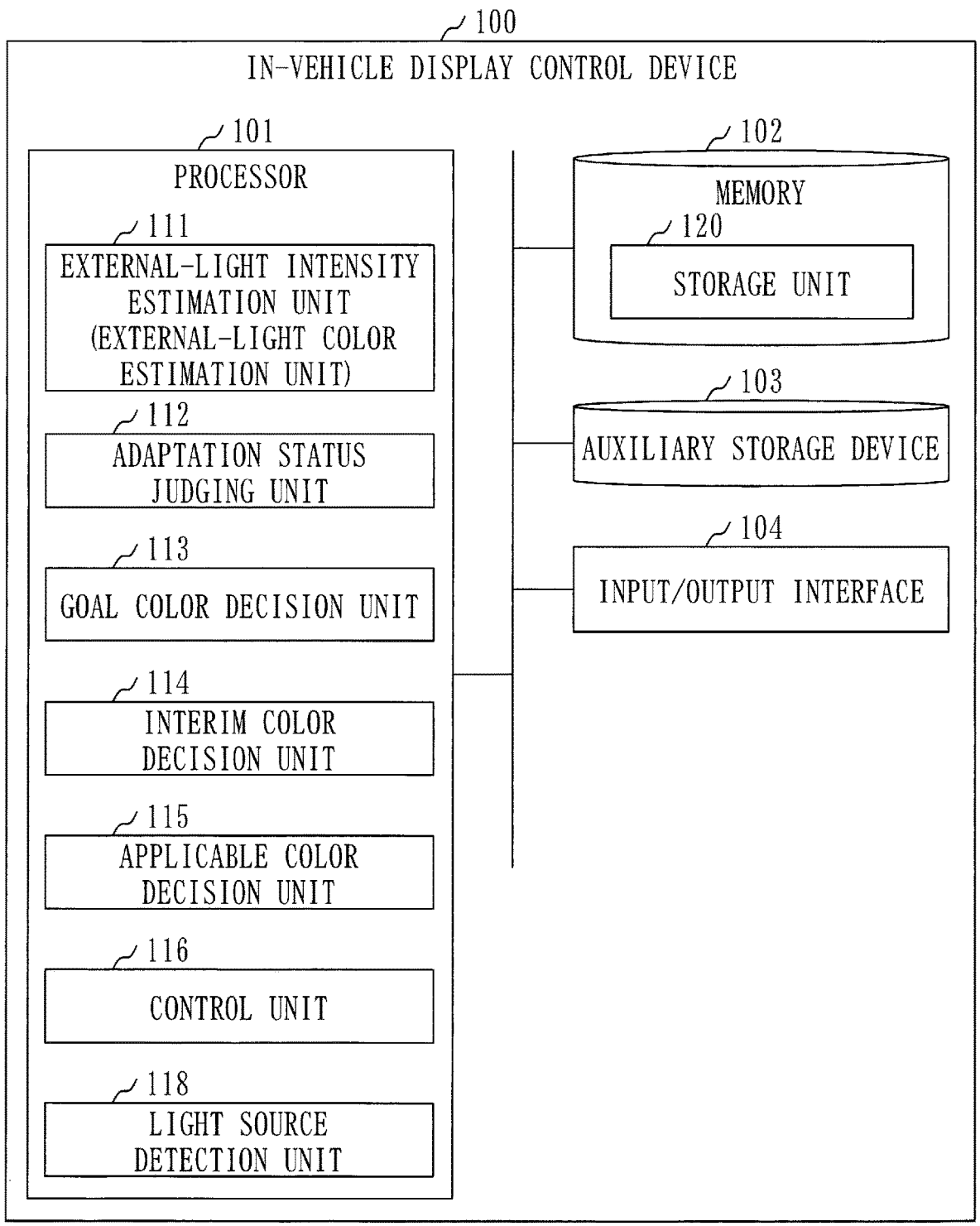
FIG. 13 is a configuration diagram of an in-vehicle display control device 100 in Embodiment 4.

A configuration of an in-vehicle display control device 100 will be described with referring to FIG. 13.

The in-vehicle display control device 100 is provided with an element which is a light source detection unit 118, in addition to the elements in Embodiment 1. The light source detection unit 118 is implemented by software.

An in-vehicle display control program causes the computer to further function as the light source detection unit 118.

*Description of Operations*

Figure 14:
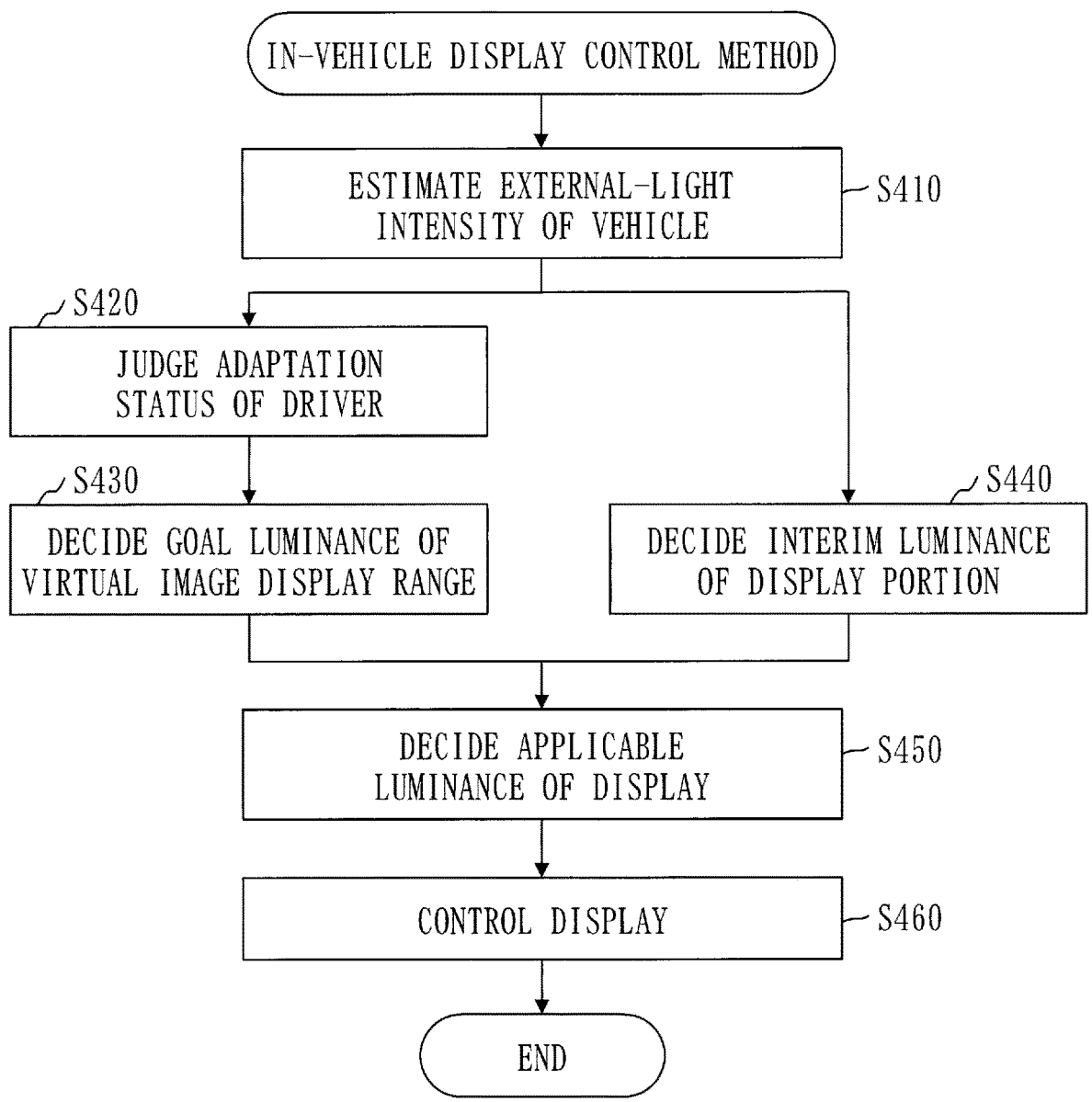
FIG. 14 is a flowchart of an in-vehicle display control method in Embodiment 4.

An in-vehicle display control method will be described with referring to FIG. 14.

Step S410 to step S460 are executed repeatedly.

In step S410, an external-light intensity estimation unit 111 estimates an external-light intensity of a vehicle based on a type of a headlight of an oncoming vehicle.

The headlight of the oncoming vehicle is a light source that emits external light.

An external-light intensity estimation process (S410) in detail will be described later.

Step S420 to step S460 are the same as step S120 to step S160 in Embodiment 1.

Figure 15:
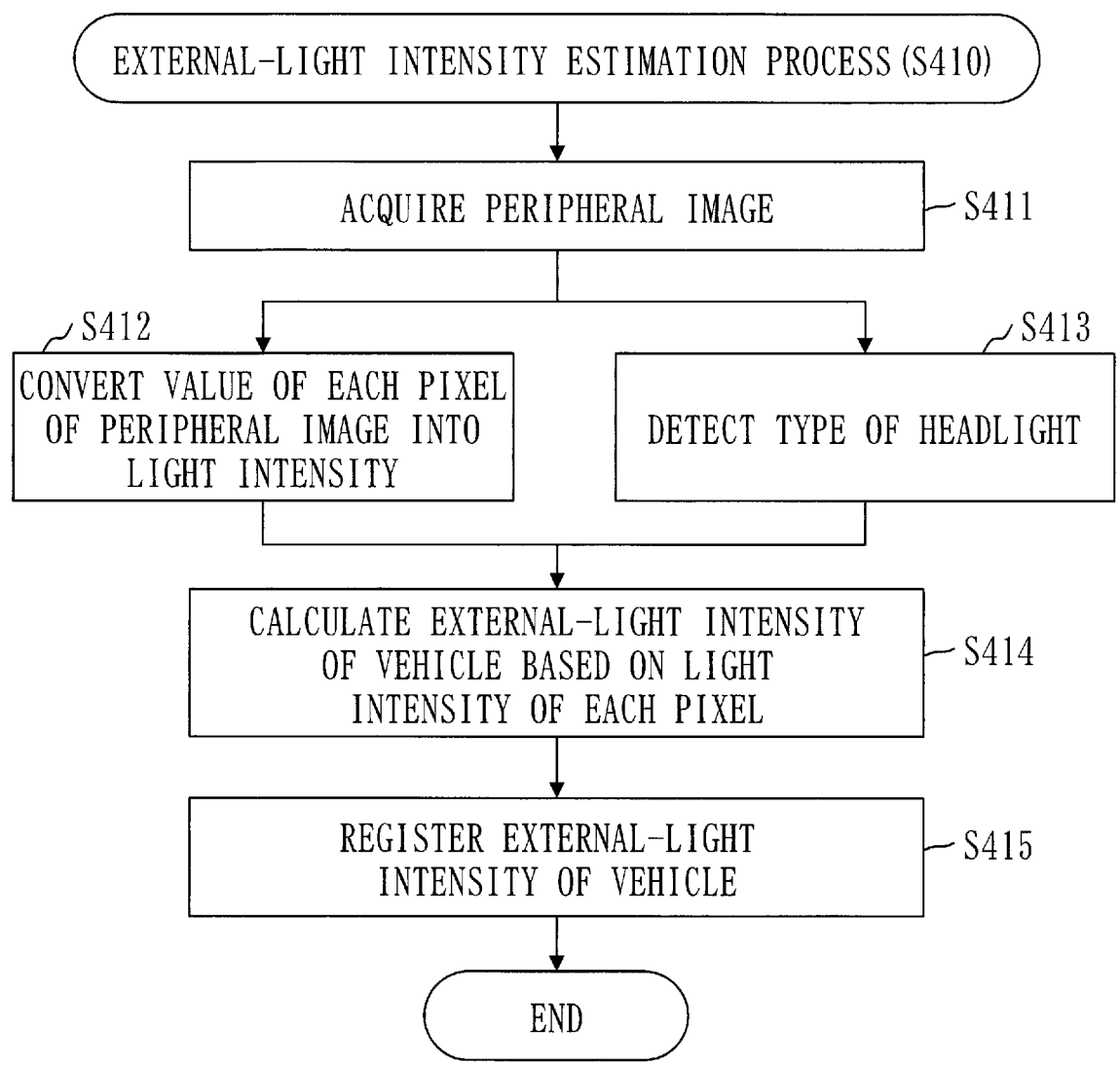
FIG. 15 is a flowchart of an external-light intensity estimation process (S410) in Embodiment 4.

The external-light intensity estimation process (S410) will be described with referring to FIG. 15.

In step S411, the external-light intensity estimation unit 111 acquires a peripheral image.

Step S411 is the same as step S111 in Embodiment 1 (see FIG. 4).

In step S412, the external-light intensity estimation unit 111 converts a value of each pixel of the peripheral image into a light intensity.

Step S412 is the same as step S112 in Embodiment 1 (see FIG. 4).

In step S413, the light source detection unit 118 detects the type of the headlight of the oncoming vehicle.

Specifically, the light source detection unit 118 judges whether or not the headlight of the oncoming vehicle is a variable light distribution headlight.

A variable light distribution headlight is a headlight that adjusts light distribution in accordance with whether or not there is another vehicle or a pedestrian.

For example, the light source detection unit 118 detects the type of the headlight as follows.

The light source detection unit 118 performs image analysis of the peripheral image to detect the type of the headlight reflected in the peripheral image. Specifically, the light source detection unit 118 selects a headlight portion from the peripheral image based on the value of each pixel of the peripheral image. The headlight portion is a portion where the headlight is reflected. The light source detection unit 118 performs image analysis of the headlight portion to detect the type of the headlight.

For example, the light source detection unit 118 detects the type of the headlight as follows.

The light source detection unit 118 communicates with the oncoming vehicle using the communication device 213 so as to acquire headlight information from the oncoming vehicle. The headlight information indicates the type of the headlight.

Then, the light source detection unit 118 detects the type of the headlight, based on the headlight information.

In step S414, the external-light intensity estimation unit 111 calculates an external-light intensity of the vehicle based on the light intensity of each pixel of the peripheral image.

A method for calculation is the same as that of step S113 in Embodiment 1 (see FIG. 4).

Then, the external-light intensity estimation unit 111 adjusts a value of the external-light intensity of the vehicle based on the type of the headlight of the oncoming vehicle.

For example, the external-light intensity estimation unit 111 adjusts the value of the external-light intensity of the vehicle as follows.

If the headlight of the oncoming vehicle is a variable light distribution headlight, it is supposed that the light intensity from the headlight of the oncoming vehicle can be suppressed. Therefore, the external-light intensity estimation unit 111 decreases the external-light intensity of the vehicle by an adjustment amount. The adjustment amount is a predetermined value. Alternatively, the adjustment value may be calculated based on the external-light intensity inside the vehicle.

If the headlight of the oncoming vehicle is not a variable light distribution headlight, the external-light intensity estimation unit 111 does not change the external-light intensity of the vehicle.

In step S415, the external-light intensity estimation unit 111 registers the external-light intensity of the vehicle in external-light intensity data as being related to a time point.

Step S415 is the same as step S114 in Embodiment 1 (see FIG. 4).

*Effect of Embodiment 4*

According to the present embodiment, it is possible to estimate the external-light intensity taking into consideration the type of the headlight that emits external light, and to decide an optimum luminance on the display 201 taking both of adaptation and visibility into consideration. As a result, the visibility on the display 201 is maintained, and the adaptation status of the driver becomes close to bright adaptation. Then, it becomes possible to reduce glare on the driver.

*Other Configurations*

Embodiment 2 may be applied to the present embodiment. That is, an applicable color of a display 201 may be decided with taking an external-light color (including the external-light intensity) into consideration.

Embodiment 3 may be applied to present embodiment. That is, an applicable luminance of the display 201 may be decided with taking a distance to a light source that emits external light, into consideration.

Embodiment 5

Figure 16:
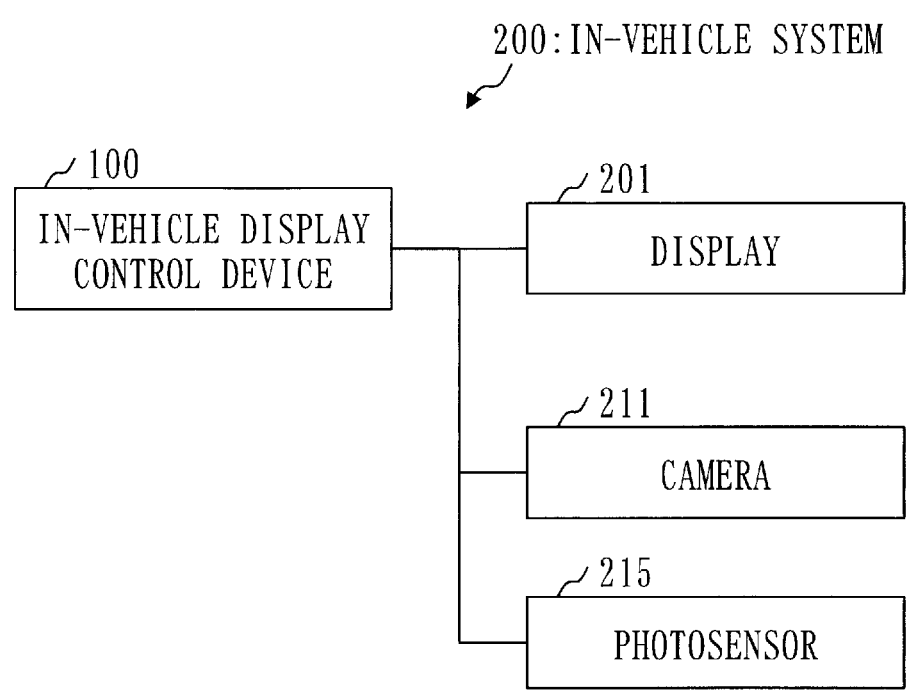
FIG. 16 is a configuration diagram of an in-vehicle system 200 in Embodiment 5.
Figure 17:
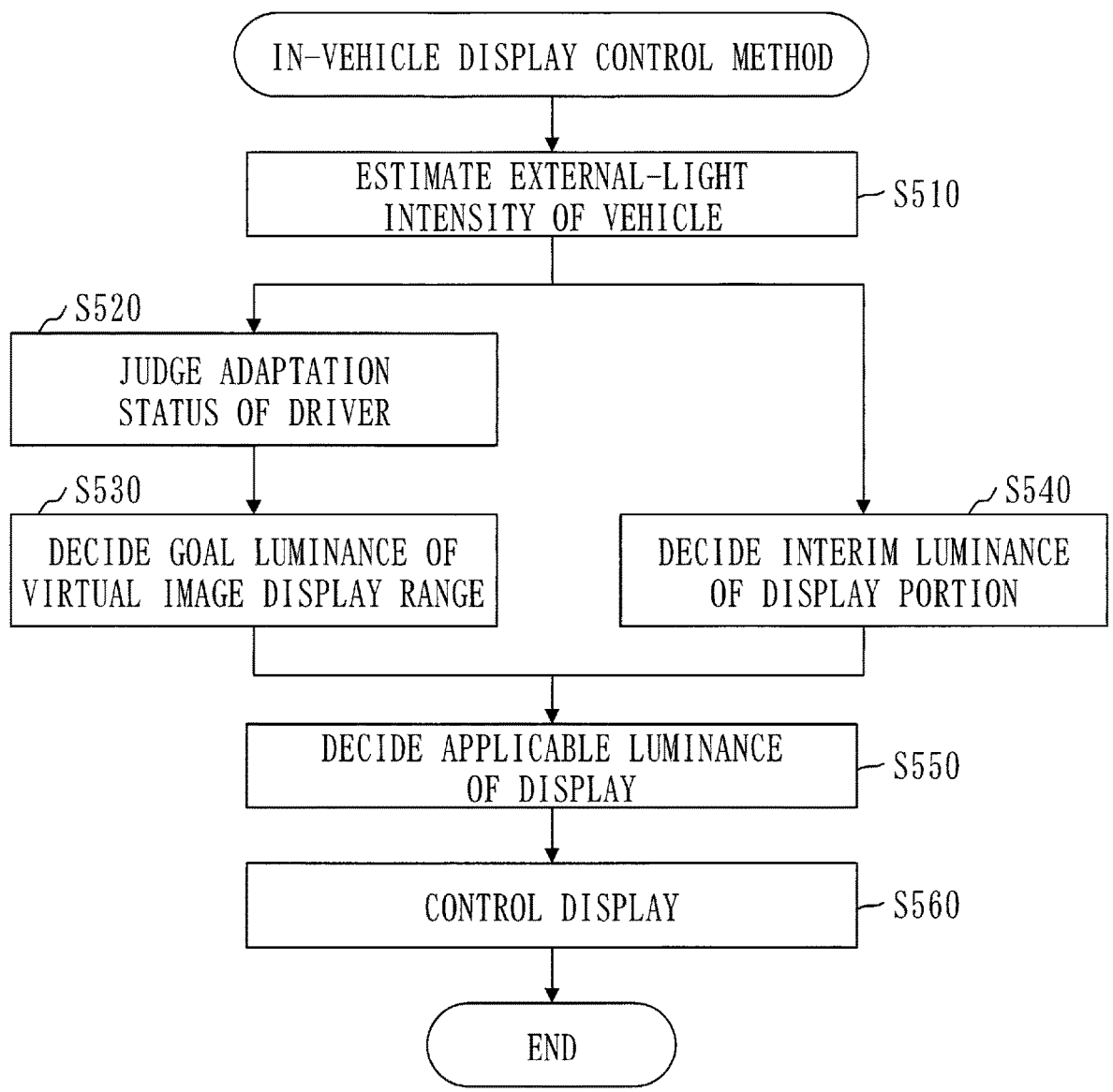
FIG. 17 is a flowchart of an in-vehicle display control method in Embodiment 5.
Figure 18:
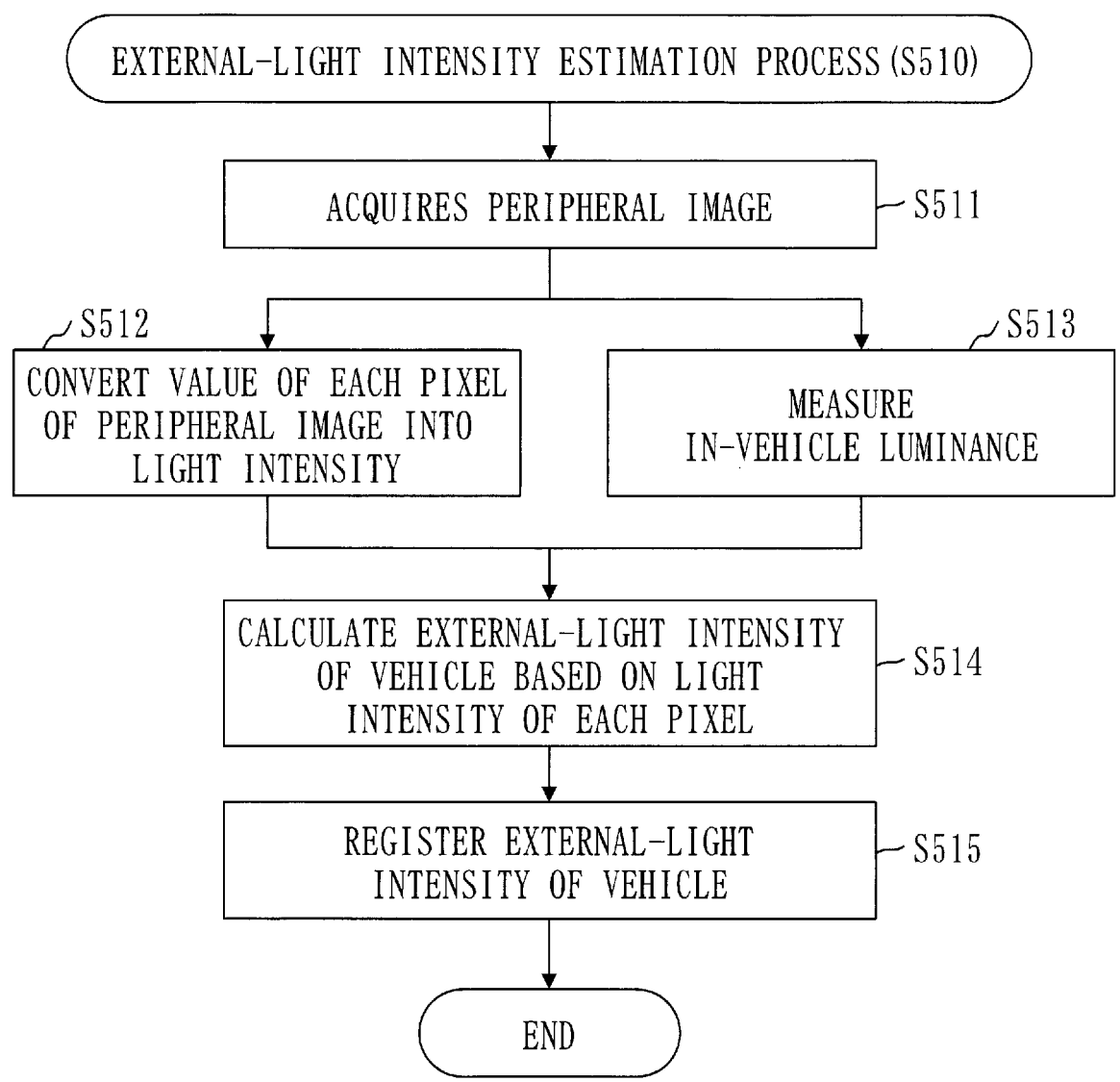
FIG. 18 is a flowchart of an external-light intensity estimation process (S510) in Embodiment 5.

A mode in which light inside a vehicle is taken into consideration will be described with referring to FIGS. 16 to 18 mainly regarding a difference from Embodiment 2.

*Description of Configurations*

A configuration of an in-vehicle system 200 will be described with referring to FIG. 16.

The in-vehicle system 200 is further provided with a photosensor 215.

The photosensor 215 is a sensor that measures luminance inside a vehicle. In this case, a camera utilized in a driver monitoring system (DMS) for monitoring a driver will be utilized as the photosensor 215.

Figure 2:
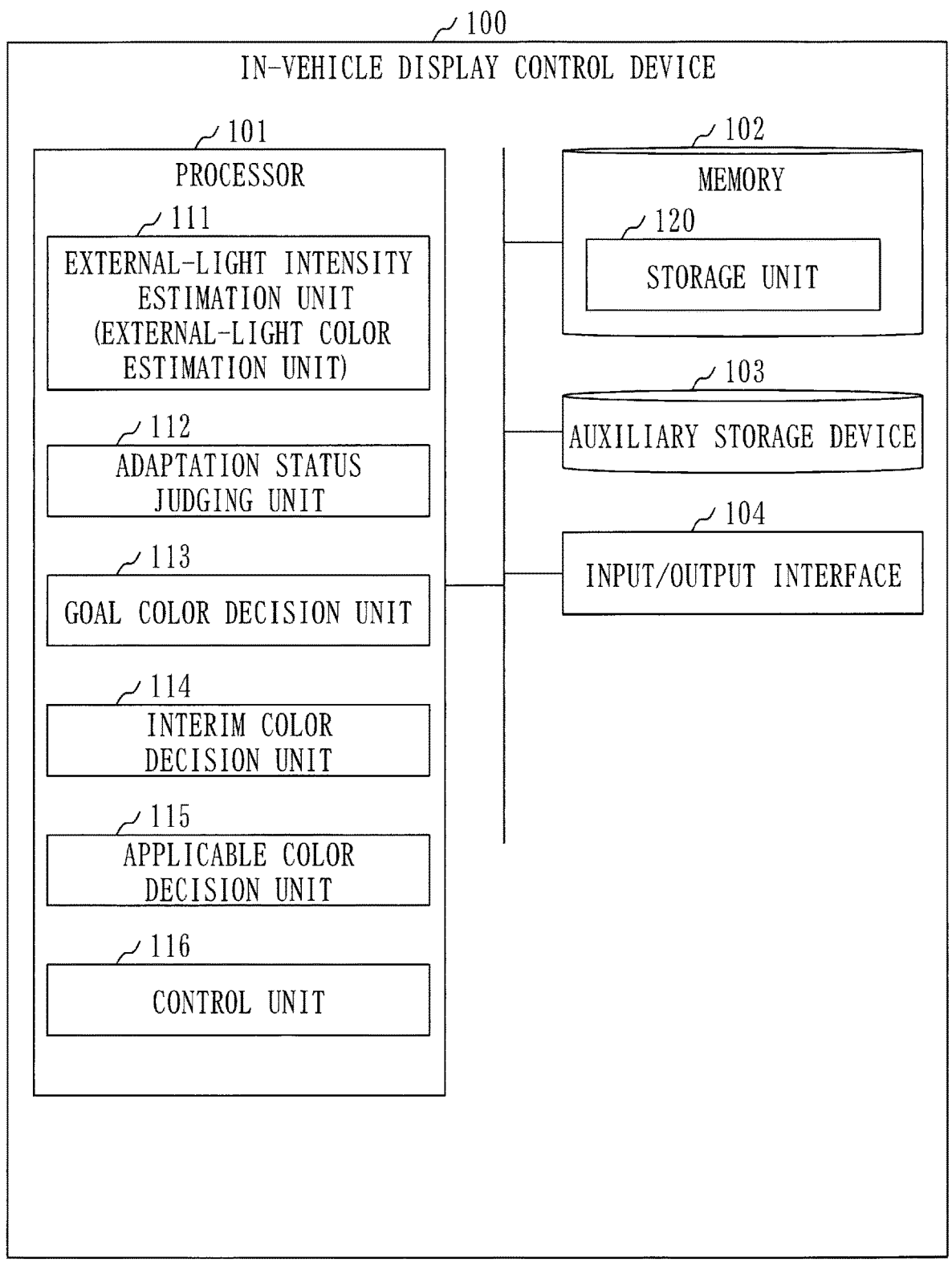
FIG. 2 is a configuration diagram of an in-vehicle display control device 100 in Embodiment 1.

A configuration of an in-vehicle display control device 100 is the same as the corresponding configuration in Embodiment 1 (see FIG. 2).

An in-vehicle display control method will be described with referring to FIG. 17.

Step S510 to step S560 are executed repeatedly.

In step S510, an external-light intensity estimation unit 111 estimates an external-light intensity of the vehicle based on the luminance inside the vehicle.

An external-light intensity estimation process (S510) in detail will be described later.

Step S520 to step S560 are the same as step S120 to step S160 in Embodiment 1.

The external-light intensity estimation process (S510) will be described with referring to FIG. 18.

In step S511, the external-light intensity estimation unit 111 acquires a peripheral image.

Step S511 is the same as step S111 in Embodiment 1 (see FIG. 4).

In step S512, the external-light intensity estimation unit 111 converts a value of each pixel of the peripheral image into a light intensity.

Step S512 is the same as step S112 in Embodiment 1 (see FIG. 4).

In step S513, the external-light intensity estimation unit 111 measures an in-vehicle luminance using the photosensor 215.

In step S514, the external-light intensity estimation unit 111 calculates the external-light intensity of the vehicle based on the light intensity of each pixel of the peripheral image.

A method for calculation is the same as that of step S113 in Embodiment 1 (see FIG. 4).

Then, the external-light intensity estimation unit 111 adjusts a value of the external-light intensity of the vehicle based on the in-vehicle luminance.

For example, the external-light intensity estimation unit 111 adjusts the value of the external-light intensity of the vehicle as follows.

The external-light intensity estimation unit 111 compares the external-light intensity with the in-vehicle luminance.

If the external-light intensity is larger than the in-vehicle luminance, the external-light intensity estimation unit 111 decreases the external-light intensity by an adjustment amount.

If the external-light intensity is smaller than the in-vehicle luminance, the external-light intensity estimation unit 111 increases the external-light intensity by the adjustment amount.

The adjustment amount is a predetermined value. However, the adjustment amount may be calculated based on a difference between the external-light intensity and the in-vehicle luminance.

In step S515, the external-light intensity estimation unit 111 registers the external-light intensity of the vehicle in external-light intensity data as being related to a time point.

Step S515 is the same as step S114 in Embodiment 1 (see FIG. 4).

*Effect of Embodiment 5*

According to the present embodiment, it is possible to estimate the external-light intensity taking light inside a vehicle into consideration, and to decide an optimum luminance on a display 201 taking both of adaptation and visibility into consideration. As a result, a visibility on the display 201 is maintained, and an adaptation status of a driver becomes close to bright adaptation. Then, it becomes possible to reduce glare on the driver.

*Other Configurations*

Embodiment 2 may be applied to the present embodiment. That is, the applicable color of the display 201 may be decided with taking the external-light color (including the external-light intensity) into consideration.

To decide the applicable color of the display 201, a vehicle interior color may be further considered. In this case, the external-light color estimation unit 119 measures the vehicle interior color using the photosensor 215. Then, the external-light color estimation unit 119 adjusts the value of the external-light color based on the vehicle interior color. Specifically, the external-light color estimation unit 119 approximates the value of the external-light color to the value of the vehicle interior color by an adjustment amount. The adjustment amount is a predetermined value. Alternatively, the adjustment amount may be calculated based on a color difference between the external-light color and the vehicle interior color.

Embodiment 3 may be applied to the present embodiment. That is, an adaptable luminance of the display 201 may be decided with taking a distance to a light source that emits external light into consideration.

Embodiment 4 may be applied to the present embodiment. That is, the adaptable luminance of the display 201 may be decided with taking the type of the headlight into consideration.

Also, in the present embodiment, a DMS camera is used as the photosensor 215. Alternatively, a new photosensor may be mounted in the vehicle.

*Supplement to Embodiments*

Figure 19:
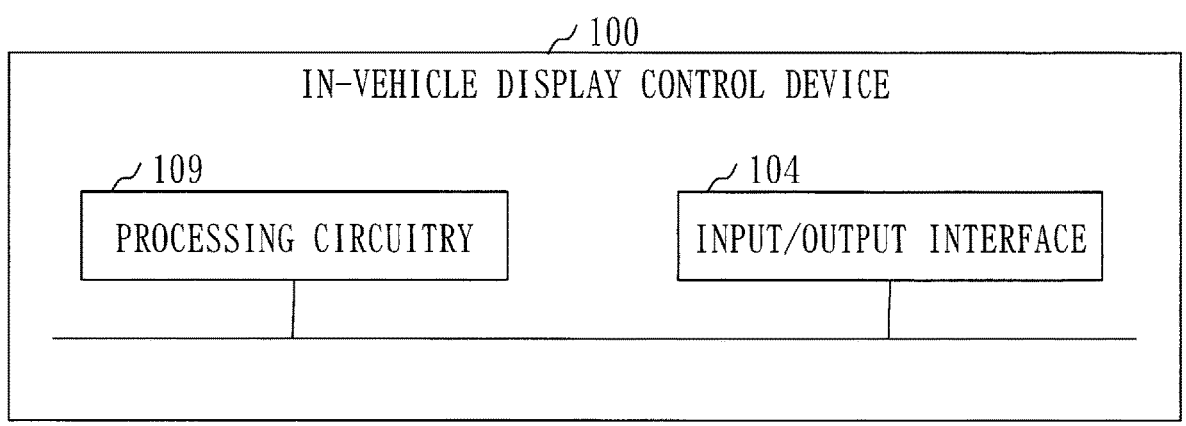
FIG. 19 is a hardware configuration diagram of the in-vehicle display control device 100 in each embodiment.

A hardware configuration of the in-vehicle display control device 100 will be described with referring to FIG. 19.

The in-vehicle display control device 100 is provided with processing circuitry 109.

The processing circuitry 109 is hardware that implements the external-light intensity estimation unit 111, the adaptation status judging unit 112, the goal color decision unit 113, the interim color decision unit 114, the applicable color decision unit 115, the control unit 116, the distance detection unit 117, the light source detection unit 118, the external-light color estimation unit 119, and the storage unit 120.

The processing circuitry 109 may be dedicated hardware, or may be the processor 101 that executes the program stored in the memory 102.

When the processing circuitry 109 is dedicated hardware, the processing circuitry 109 is, for example, one or a combination of a single circuit, a composite circuit, a programmed processor, a parallel-programmed processor, an ASIC, and an FPGA.

Note that ASIC stands for Application Specific Integrated Circuit, and FPGA stands for Field Programmable Gate Array.

The in-vehicle display control device 100 may be provided with a plurality of processing circuitries that substitute for the processing circuitry 109. The plurality of processing circuitries share a role of the processing circuitry 109.

In the processing circuitry 109, some of the functions may be implemented by dedicated hardware, and the remaining functions may be implemented by software or firmware.

In this manner, the processing circuitry 109 can be implemented by one or a combination of hardware, software, and firmware.

Each embodiment is an exemplification of a preferred mode and is not intended to limit a technical scope of the present invention. Each embodiment may be practiced partly, or may be practiced in combination with another embodiment.

Procedures described with using flowcharts or the like may be changed appropriately.

REFERENCE SIGNS LIST

100: in-vehicle display control device; 101: processor; 102: memory; 103: auxiliary storage device; 104: input/output interface; 109: processing circuitry; 111: external-light intensity estimation unit; 112: adaptation status judging unit; 113: goal color decision unit; 114: interim color decision unit; 115: applicable color decision unit; 116: control unit; 117: distance detection unit; 118: light source detection unit; 119: external-light color estimation unit; 120: storage unit; 200: in-vehicle system; 201: display; 211: camera; 212: distance sensor; 213: communication device; 214: positioning device; 215: photosensor.

The invention claimed is:

1. An in-vehicle display control device comprising:
processing circuitry
to judge an adaptation status of a driver to a color, based on external-light color data expressing a time sequence of an external-light color of a vehicle in which a display is mounted,
to decide a goal color for a virtual image display range based on the adaptation status of the driver,
to decide an applicable color of a display portion on a screen of the display based on the goal color, the display portion displaying information,
to control the display based on the applicable color of the display portion, and
to decide an interim color of the display portion based on an external-light color of the vehicle,
wherein the processing circuitry calculates an estimated color of the display range of a case where a color of the display portion is adjusted to the interim color, compares the estimated color with the goal color, and decides the applicable color of the display portion based on a comparison result.

2. The in-vehicle display control device according to claim 1,
wherein the external-light color data expresses a time sequence of an external-light intensity which is a degree of brightness of external light, and
wherein the processing circuitry
judges an adaptation status to brightness of color, to be the adaptation status of the driver, based on the external-light color data,
decides a goal luminance of the display range to be the goal color, based on the adaptation status to brightness,
decides an interim luminance of the display portion to be the interim color, based on the external-light color of the vehicle,
calculates, as the estimated color, an estimated luminance of the display range of a case where a luminance of the display portion is adjusted to the interim luminance, compares the estimated luminance with the goal luminance, and decides an applicable: luminance of the display portion to be the applicable color, based on a comparison result, and
controls the display based on the applicable luminance of the display portion.

3. The in-vehicle display control device according to claim 1,
wherein the vehicle includes a camera and a photosensor which are mounted therein, and
wherein the processing circuitry calculates the external-light color based on a peripheral image obtained by the camera, measures a vehicle interior color using the photosensor, and adjusts the calculated external-light color based on the vehicle interior color.

4. The in-vehicle display control device according to claim 2,
   wherein the vehicle includes a camera and a photosensor which are mounted therein, and
   wherein the processing circuitry calculates an external-light intensity based on a peripheral image obtained by the camera, measures an in-vehicle luminance using the photosensor, and adjusts the calculated external-light intensity based on the in-vehicle luminance.

5. An in-vehicle display control device comprising:
   processing circuitry
   to judge an adaptation status of a driver to a color, based on external-light color data expressing a time sequence of an external-light color of a vehicle in which a display is mounted,
   to decide a goal color for a virtual image display range based on the adaptation status of the driver,
   to decide an applicable color of a display portion on a screen of the display based on the goal color, the display portion displaying information, and
   to control the display based on the applicable color of the display portion,
   wherein the processing circuitry judges a change tendency of a light source distance based on light source distance data expressing a time sequence of a light source distance which is a distance to a light source that emits external light, and adjusts the goal color of the display based on the change tendency of the light source distance.

6. The in-vehicle display control device according to claim 5,
   wherein the vehicle includes a camera and a distance sensor which are mounted therein, and
   wherein the processing circuitry judges a light source direction based on a peripheral image obtained by the camera, and measures a distance to the light source located in the light source direction, using the distance sensor.

7. The in-vehicle display control device according to claim 5,
   wherein the vehicle includes a communication device mounted therein, and
   wherein the processing circuitry communicates with an oncoming vehicle using the communication device so as to acquire position information of the oncoming vehicle, and calculates a light source distance based on the position information of the oncoming vehicle and position information of the vehicle.

8. An in-vehicle display control device comprising:
   processing circuitry
   to judge an adaptation status of a driver to a color, based on external-light color data expressing a time sequence of an external-light color of a vehicle in which a display and a camera are mounted,
   to decide a goal color for a virtual image display range based on the adaptation status of the driver,
   to decide an applicable color of a display portion on a screen of the display based on the goal color, the display portion displaying information,
   to control the display based on the applicable color of the display portion,
   to judge whether a headlight of an oncoming vehicle is a variable light distribution headlight, and
   to calculate the external-light color based on a peripheral image obtained by the camera, and to adjust the calculated external-light color if the headlight of the oncoming vehicle is the variable light distribution headlight.

9. The in-vehicle display control device according to claim 8,
   wherein the processing circuitry performs image analysis of the peripheral image so as to judge whether the headlight reflected in the peripheral image is the variable light distribution headlight.

10. The in-vehicle display control device according to claim 8,
    wherein the vehicle includes a communication device mounted therein, and
    wherein the processing circuitry communicates with the oncoming vehicle using the communication device so as to acquire headlight information from the oncoming vehicle, and judges whether the headlight is the variable light distribution headlight based on the headlight information.

* * * * *